(12) United States Patent
Lee et al.

(10) Patent No.: US 12,309,778 B2
(45) Date of Patent: May 20, 2025

(54) METHOD AND DEVICE FOR TRANSMITTING SIDELINK CONTROL CHANNEL IN NR V2X

(71) Applicant: LG Electronics Inc., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 441 days.

(21) Appl. No.: 17/773,210

(22) PCT Filed: Nov. 2, 2020

(86) PCT No.: PCT/KR2020/015140
§ 371 (c)(1),
(2) Date: Apr. 29, 2022

(87) PCT Pub. No.: WO2021/086150
PCT Pub. Date: May 6, 2021

(65) Prior Publication Data
US 2022/0394699 A1 Dec. 8, 2022

Related U.S. Application Data

(60) Provisional application No. 62/929,092, filed on Oct. 31, 2019, provisional application No. 62/931,206, filed on Nov. 5, 2019.

(30) Foreign Application Priority Data

Nov. 1, 2019 (KR) ........................ 10-2019-0138931

(51) Int. Cl.
*H04L 1/00* (2006.01)
*H04W 4/40* (2018.01)
(Continued)

(52) U.S. Cl.
CPC .......... *H04W 72/20* (2023.01); *H04L 1/0004* (2013.01); *H04W 4/40* (2018.02); *H04W 28/26* (2013.01); *H04W 72/0453* (2013.01)

(58) Field of Classification Search
CPC ... H04L 1/0004; H04L 5/0053; H04L 5/0094; H04L 1/0031; H04L 1/1819;
(Continued)

(56) References Cited

U.S. PATENT DOCUMENTS

2019/0289627 A1* 9/2019 Blasco Serrano .... H04W 56/00
2019/0327732 A1* 10/2019 Yoon ................. H04W 72/0446
(Continued)

FOREIGN PATENT DOCUMENTS

KR 1020130140728 12/2013

OTHER PUBLICATIONS

LG Electronics, Discussion on physical layer structure for NR sidelink, R1-1910777, 3GPP TSG RAN WG1 #98bis, Chongqing, China, Oct. 8, 2019, see section 2.1.2.1; and figure 3.
(Continued)

*Primary Examiner* — Chi Ho A Lee
(74) *Attorney, Agent, or Firm* — BRYAN CAVE LEIGHTON PAISNER LLP

(57) ABSTRACT

Provided according to an embodiment of the present disclosure is a method for performing sidelink communication by a first device. The method may comprise the steps of: transmitting a PSCCH to a second device on the basis of one sub-channel among M sub-channels associated with a sidelink slot; and transmitting a PSSCH associated with the PSCCH to the second device on the basis of N sub-channels among the M sub-channels.

7 Claims, 33 Drawing Sheets

(51) Int. Cl.
*H04W 28/26* (2009.01)
*H04W 72/0453* (2023.01)
*H04W 72/20* (2023.01)

(58) Field of Classification Search
CPC ....... H04L 1/1893; H04L 1/08; H04L 1/0026; H04W 4/44; H04W 72/20; H04W 4/40; H04W 28/26; H04W 72/0453
See application file for complete search history.

(56) References Cited

U.S. PATENT DOCUMENTS

| | | | |
|---|---|---|---|
| 2020/0099479 A1* | 3/2020 | Park | H04W 4/70 |
| 2020/0100306 A1* | 3/2020 | Ayaz | H04W 88/04 |
| 2021/0219268 A1* | 7/2021 | Li | H04B 17/318 |
| 2022/0086860 A1* | 3/2022 | Panteleev | H04W 72/20 |
| 2023/0055127 A1* | 2/2023 | Li | H04W 80/02 |

OTHER PUBLICATIONS

NEC, Physical layer structure for NR sidelink, R1-1911026, 3GPP TSG RAN WG1 #98bis, Chongqing, China, Oct. 8, 2019, see section 2; and figure 1.

Ericsson, PHY layer structure for NR sidelink, R1-1910532, 3GPP TSG-RAN WG1 Meeting #98bis, Chongqing, China, Oct. 7, 2019, see section 3.4; and figure 1.

Nokia et al., Discussion of physical structure for sidelink, R1-1910512, 3GPP TSG RAN WG1 #98bis, Chongqing, China, Oct. 8, 2019, see section 2.2; and figure 1.

* cited by examiner

METHOD AND DEVICE FOR TRANSMITTING SIDELINK CONTROL CHANNEL IN NR V2X

This application is the National Stage filing under 35 U.S.C. 371 of International Application No. PCT/KR2020/015140 filed on Nov. 2, 2020, which claims priority to U.S. Provisional Application No. 62/929,092 filed on Oct. 31, 2019; 62/931,206 filed on Nov. 5, 2019 and Korean Patent Application No. 10-2019-0138931 filed on Nov. 1, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

An object of the present disclosure is to provide a sidelink (SL) communication method between apparatuses (or UEs) and an apparatus (or UE) for performing the same.

Another technical problem of the present disclosure is to provide a method for transmitting a sidelink control channel in NR V2X and an apparatus (or UE) for performing the same.

Technical Solutions

According to an embodiment of the present disclosure, a method for performing, by a first apparatus, sidelink communication may be proposed. The method may comprise: transmitting a physical sidelink control channel (PSCCH) to a second apparatus, based on one subchannel among M subchannels related to a sidelink slot; and transmitting a physical sidelink shared channel (PSSCH) related to the PSCCH to the second apparatus, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

According to an embodiment of the present disclosure, a first apparatus for performing wireless communication may be proposed. The first apparatus may comprise: one or more memories storing instructions; one or more transceivers; and one or more processors connected to the one or more memories and the one or more transceivers, wherein the one or more processors execute the instructions to: transmit a physical sidelink control channel (PSCCH) to a second apparatus, based on one subchannel among M subchannels related to a sidelink slot; and transmit a physical sidelink shared channel (PSSCH) related to the PSCCH to the second apparatus, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

According to an embodiment of the present disclosure, an apparatus (or a chip(set)) configured to control a first user equipment (UE) may be proposed. The apparatus may comprise: one or more processors; and one or more memories operably connectable to the one or more processors and storing instructions, wherein the one or more processors execute the instructions to: transmit a physical sidelink control channel (PSCCH) to a second UE, based on one subchannel among M subchannels related to a sidelink slot; and transmit a physical sidelink shared channel (PSSCH) related to the PSCCH to the second UE, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

According to an embodiment of the present disclosure, a non-transitory computer-readable storage medium storing instructions (or commands) may be proposed. The instructions, when executed, may cause a first apparatus to: transmit a physical sidelink control channel (PSCCH) to a second apparatus, based on one subchannel among M subchannels related to a sidelink slot; and transmit a physical sidelink shared channel (PSSCH) related to the PSCCH to the second apparatus, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

According to an embodiment of the present disclosure, a method for performing, by a second apparatus, sidelink communication may be proposed. The method may comprise: receiving a physical sidelink control channel (PSCCH) from a first apparatus, based on one subchannel among M subchannels related to a sidelink slot; and receiving a physical sidelink shared channel (PSSCH) related to the PSCCH from the first apparatus, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

According to an embodiment of the present disclosure, a second apparatus for performing wireless communication may be proposed. The second apparatus may comprise: one or more memories storing instructions; one or more transceivers; and one or more processors connected to the one or more memories and the one or more transceivers, wherein the one or more processors execute the instructions to: receive a physical sidelink control channel (PSCCH) from a first apparatus, based on one subchannel among M subchannels related to a sidelink slot; and receive a physical sidelink shared channel (PSSCH) related to the PSCCH from the first apparatus, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

Effects of the Disclosure

According to the present disclosure, sidelink communication between apparatuses (or UEs) can be efficiently performed.

According to this disclosure, even if any PSCCH (Physical Sidelink Control Channel) candidate resource in a resource pool is used, the average interference level (i.e., PSCCH decoding success probability) can be similarly guaranteed.

DESCRIPTION OF EXEMPLARY EMBODIMENTS

Figure 1:
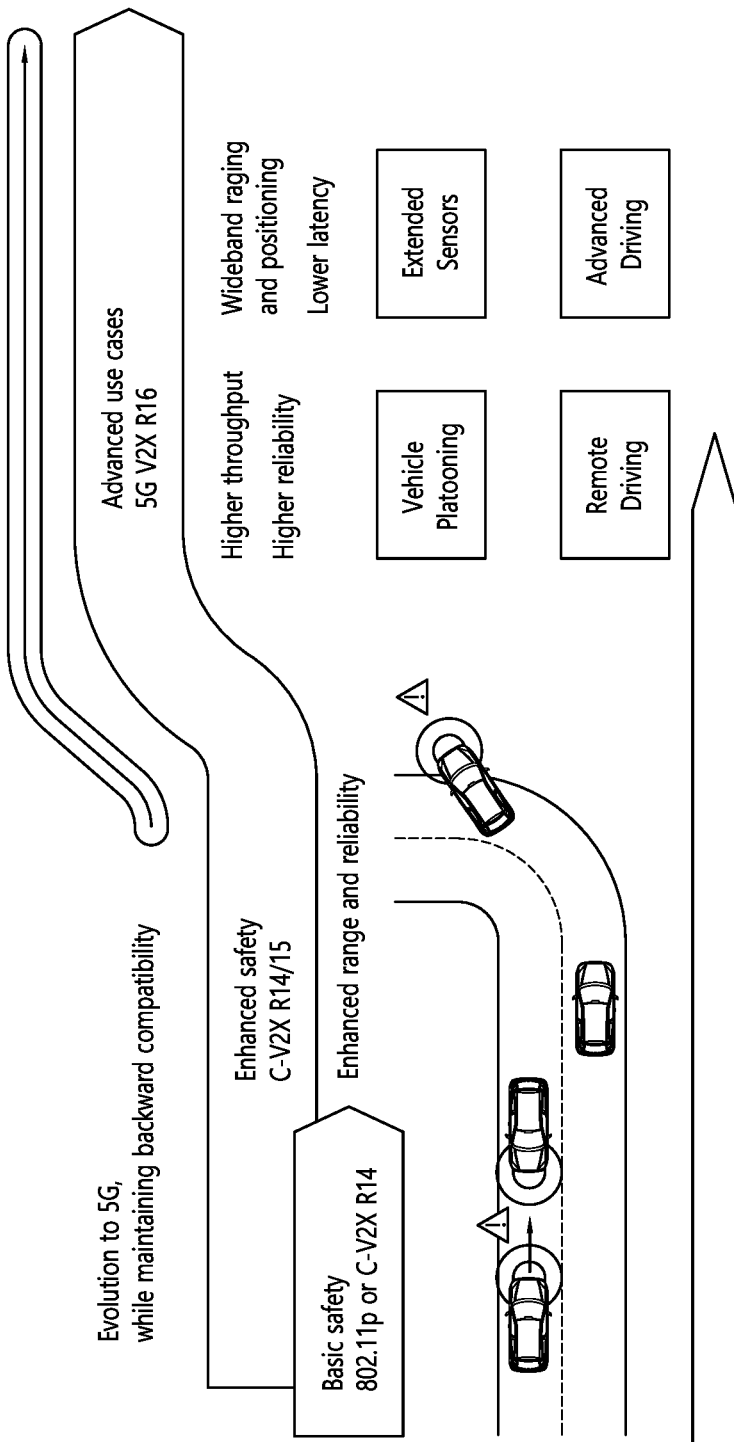
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
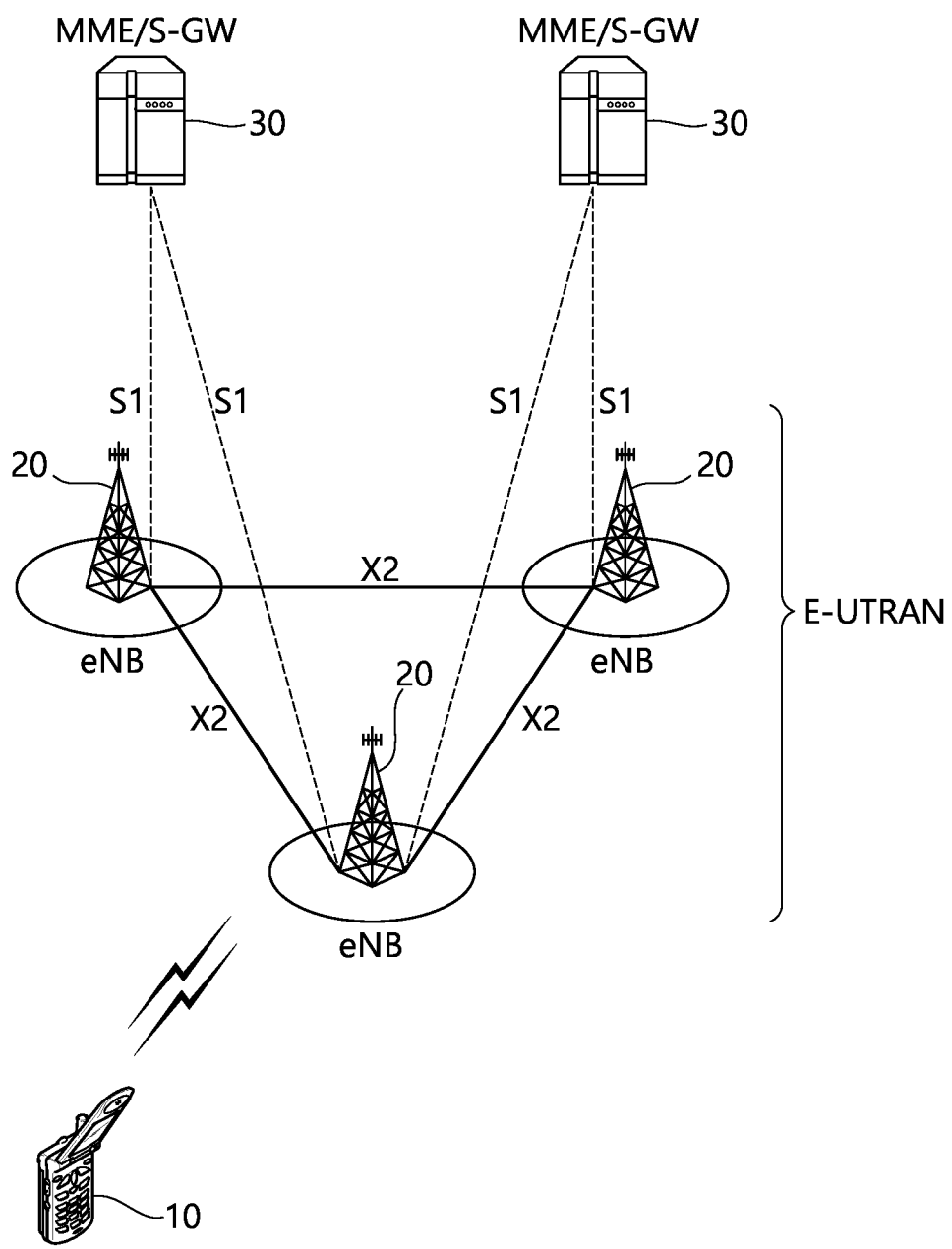
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
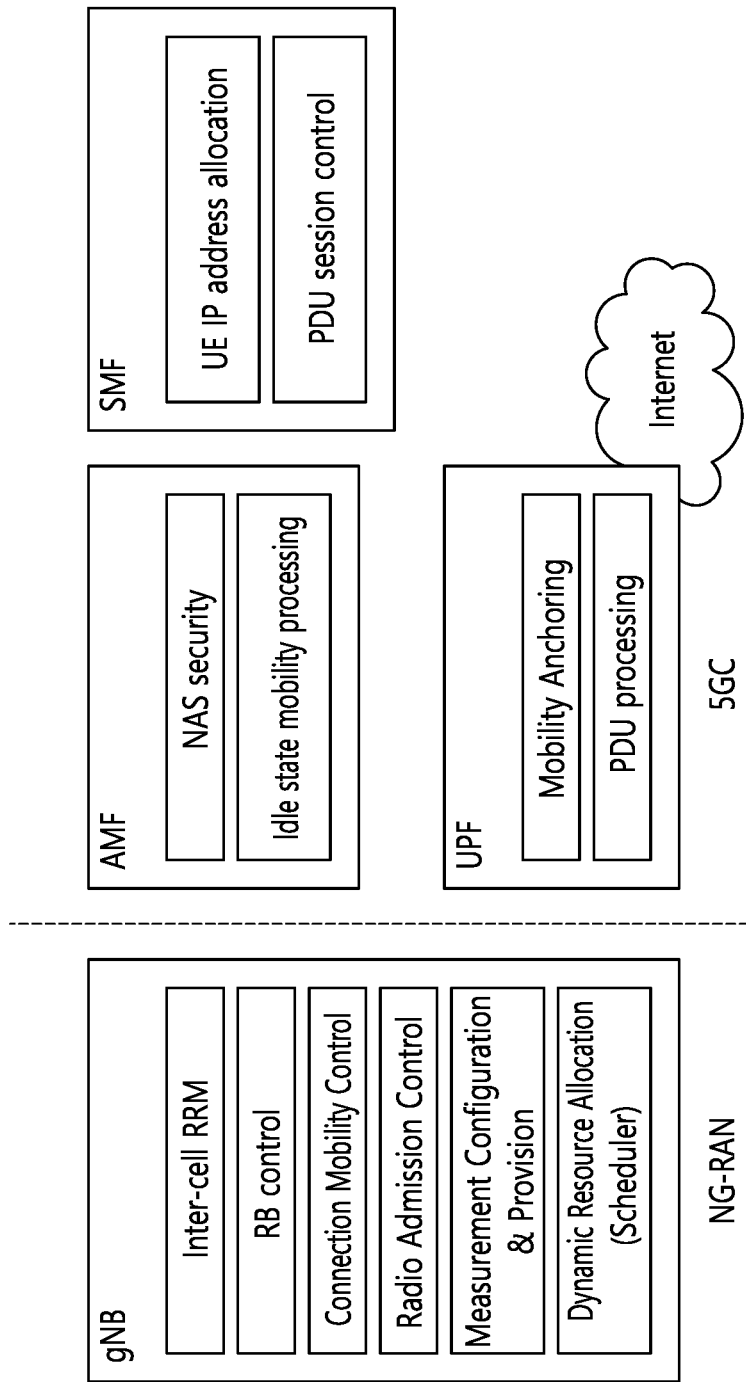
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
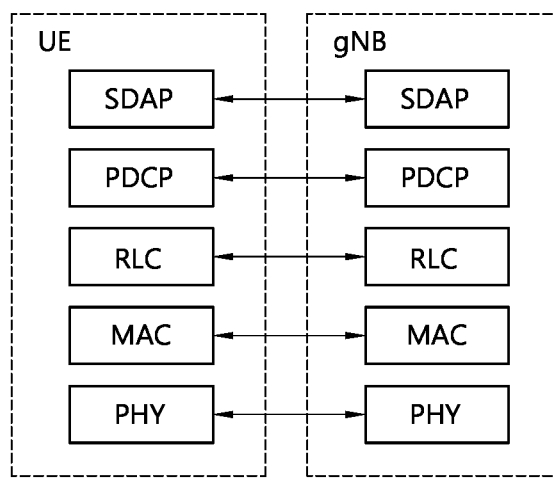
FIGS. 4A and 4B show a radio protocol architecture, based on an embodiment of the present disclosure.
Figure 4B:
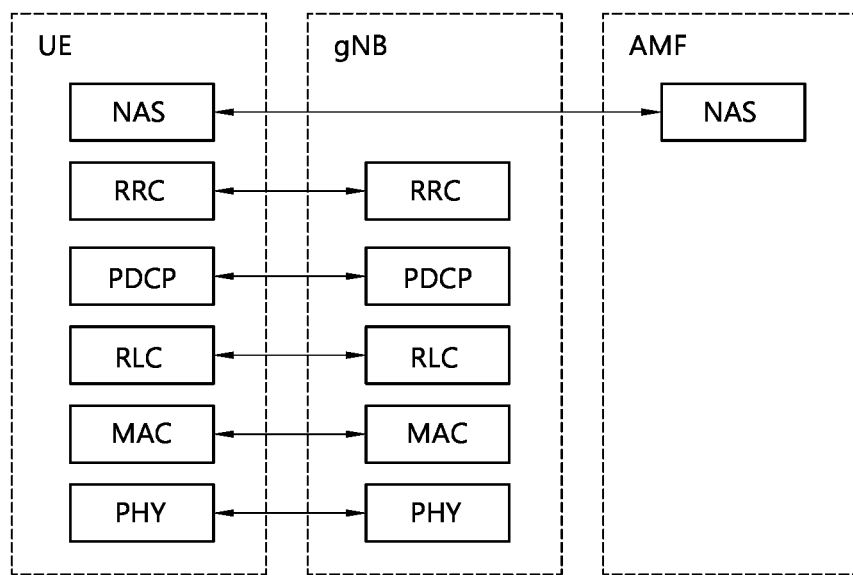

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
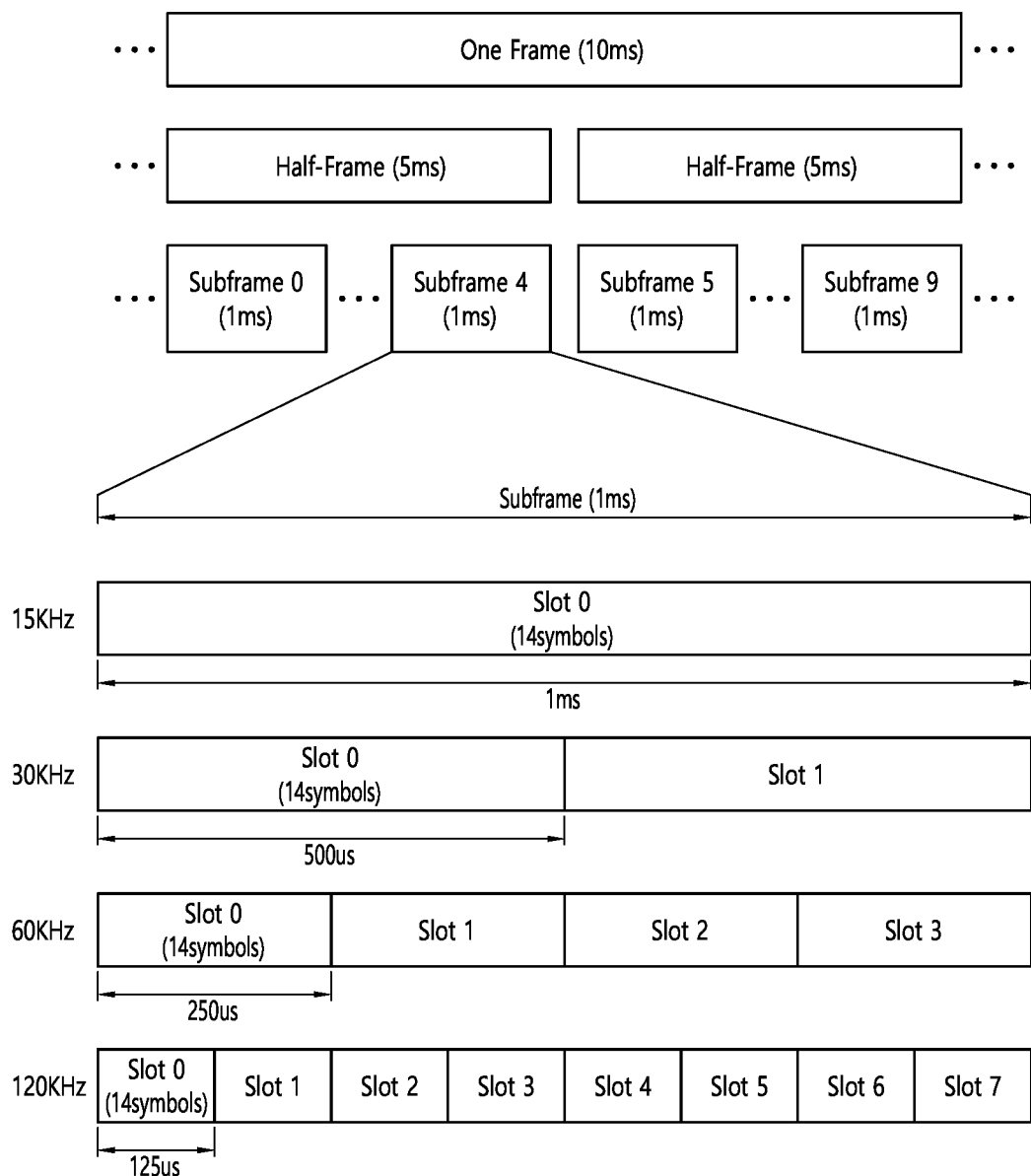
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15 * 2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15 * 2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
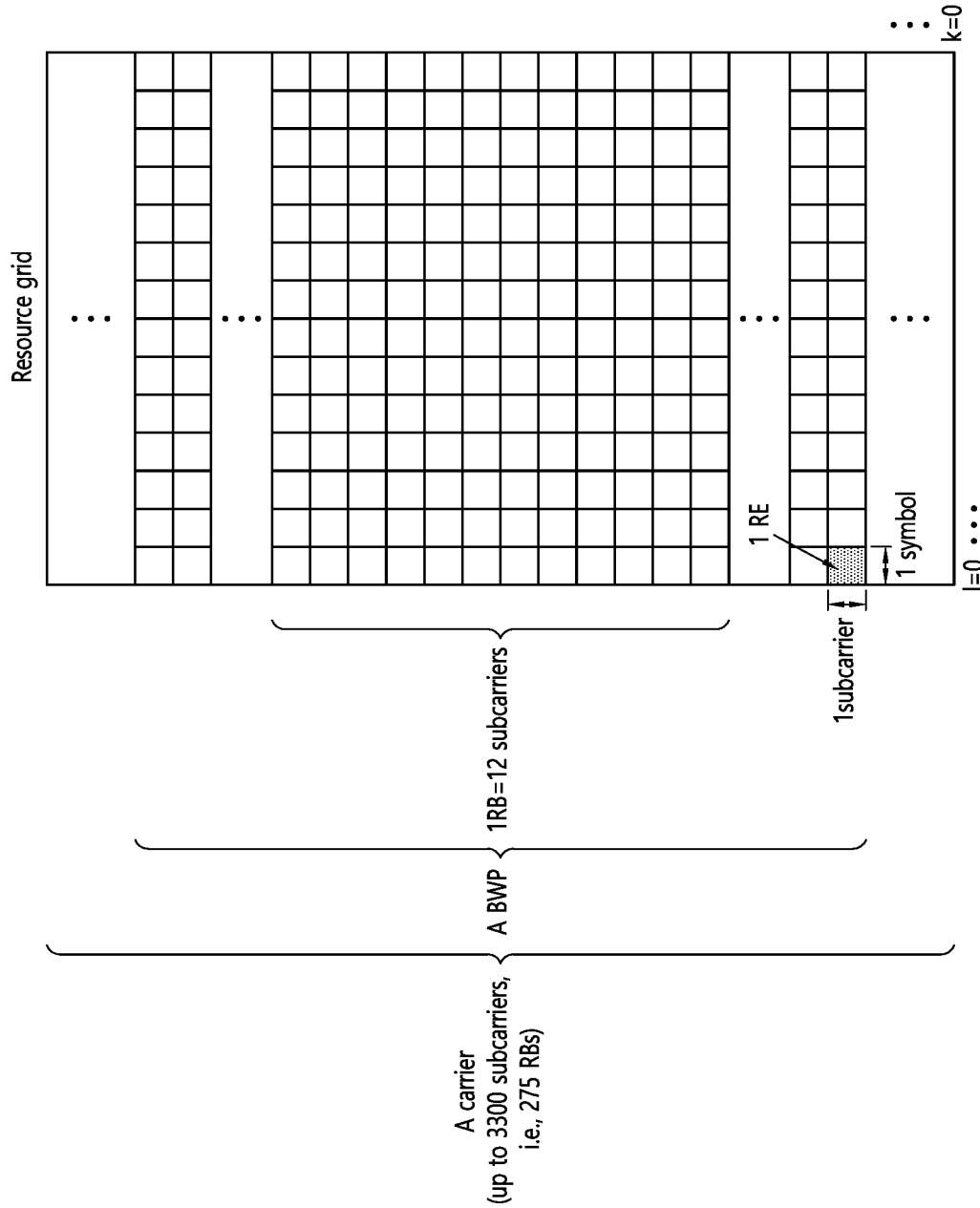
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
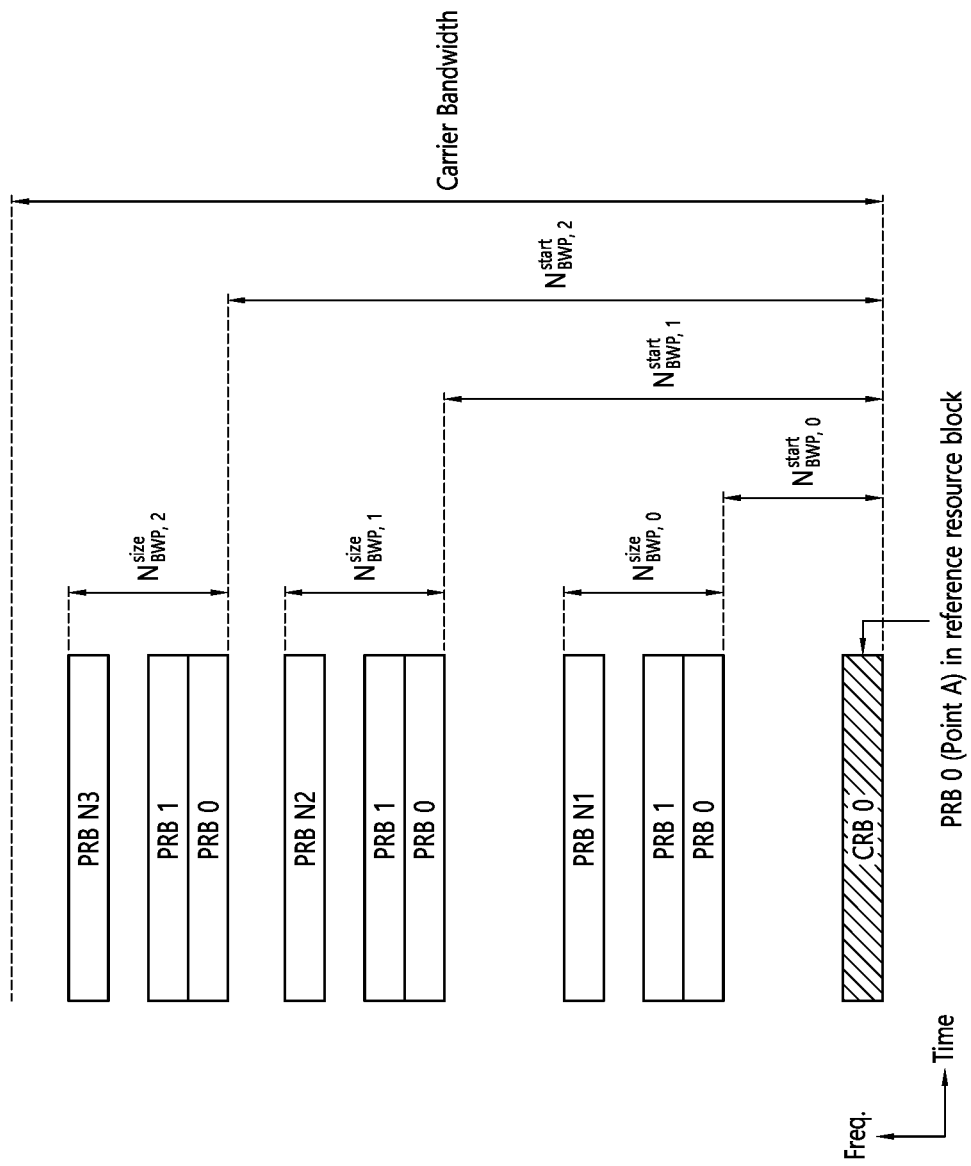
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
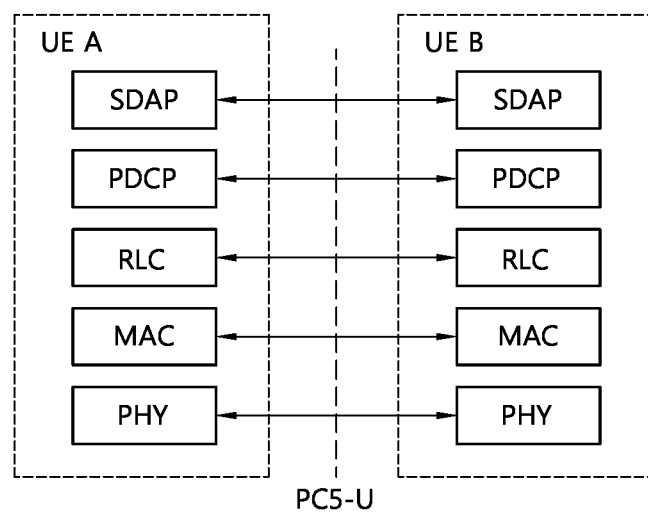
FIGS. 8A and 8B show a radio protocol architecture for a SL communication, based on an embodiment of the present disclosure.
Figure 8B:
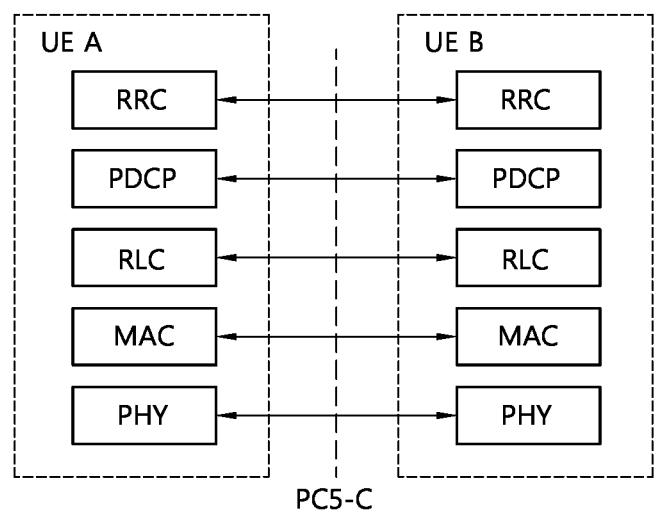

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
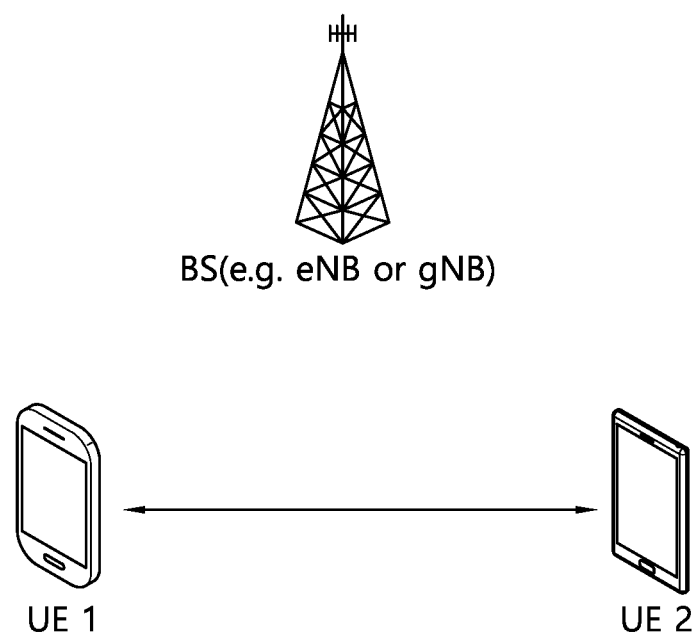
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
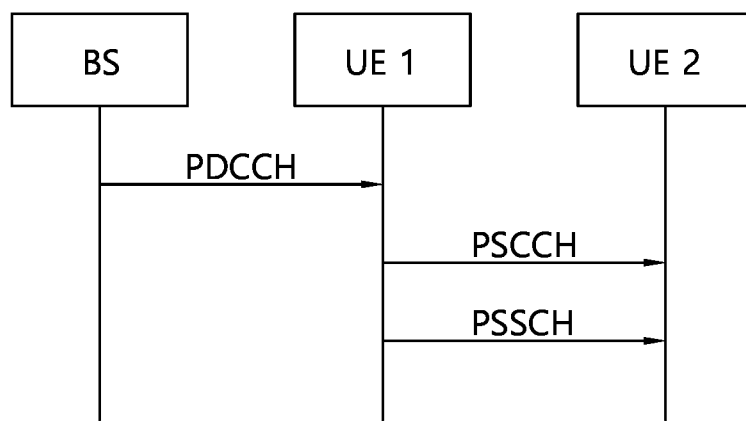
FIGS. 10A and 10B show a procedure of performing V2X or SL communication by a UE based on a transmission mode, based on an embodiment of the present disclosure.
Figure 10B:
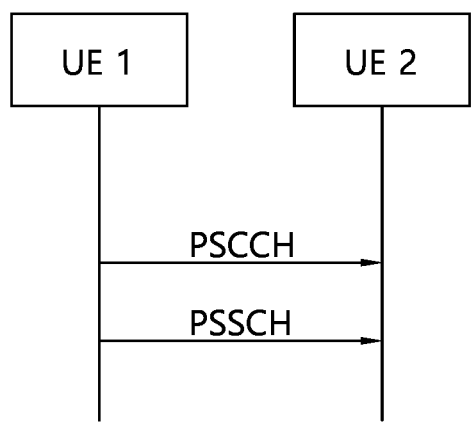

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
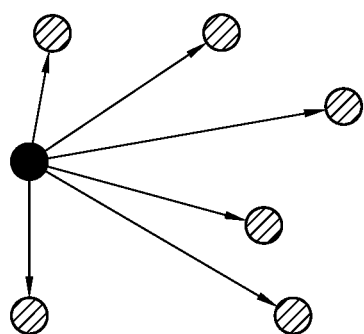
FIGS. 11A to 11C show three cast types, based on an embodiment of the present disclosure.
Figure 11B:
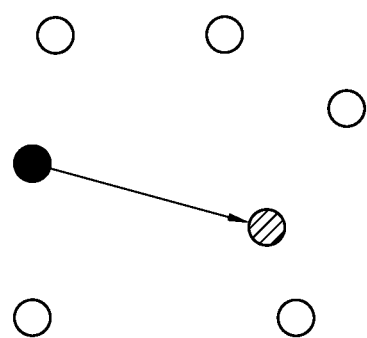
Figure 11C:
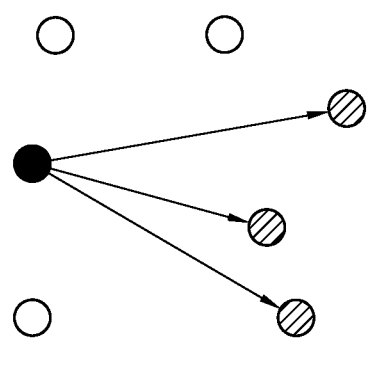

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) (or action(s)) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, Sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

Meanwhile, in various embodiments of the present disclosure, a high priority may mean a small priority value, and a low priority may mean a large priority value. For example, Table 5 shows an example of priorities.

TABLE 5

| service or logical channel | priority value |
| --- | --- |
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the highest priority value may have the lowest priority.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Meanwhile, in various embodiments of the present disclosure, for example, a transmitting UE (TX UE) may be a UE transmitting data to a (target) receiving UE (RX UE). For example, a TX UE may be a UE transmitting a PSCCH and/or a PSSCH. And/or, for example, a TX UE may be a UE that transmits an SL CSI-RS and/or SL CSI report request indicator to a (target) RX UE. And/or, for example, a TX UE to the (target) RX UE to be used for SL (L1) RSRP measurement (predefined) RS (e.g., PSSCH DM-RS) (and/or SL (L1) RSRP Report request indicator) may be a UE performing transmission. And/or, for example, a TX UE may be a UE that performs (pre-defined) RS (e.g., PSSCH DM-RS) (and/or SL (L1) RSRP report request indicator) transmission to be used for SL (L1) RSRP measurement to a (target) RX UE. And/or, for example, a TX UE may be a UE transmitting a (control) channel (e.g., PSCCH, PSSCH, etc.) and/or a reference signal (e.g., DM-RS, CSI-RS, etc.) on the (control) channel, to be used for SL RLM and/or SL RLF operation of a (target) RX UE.

Meanwhile, in the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. For example, the RX UE may be a UE which performs SL CSI transmission to TX UE(s) based on SL CSI-RS(s) and/or a SL CSI report request indication received from TX UE(s). For example, the RX UE may be a UE which transmits, to TX UE(s), an SL (L1) RSRP measurement value measured based on (pre-defined) reference signal(s) and/or SL (L1) RSRP report request indication received from TX UE(s). For example, the RX UE may be a UE which transmits its own data to TX UE(s). For example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, for example, when an RX UE transmits SL HARQ feedback information for the PSSCH and/or PSCCH received from a TX UE, the method below or some of the methods below may be considered. Here, for example, the following scheme or some of the following schemes may be limitedly applied only when an RX UE successfully decodes/detects a PSCCH scheduling a PSSCH.

(1) Groupcast HARQ feedback option 1: NACK information may be transmitted to a TX UE only when an RX UE fails to decode/receive a PSSCH received from the TX UE.
(2) Groupcast HARQ feedback option 2: If an RX UE succeeds in decoding/receiving a PSSCH received from a TX UE, transmit ACK information to the TX UE, and if the RX UE fails to decode/receive a PSSCH, it may transmit NACK information to the TX UE.

Meanwhile, in the present disclosure, a TX UE may transmit the entirety or part of information described below to RX UE(s) through SCI(s). Herein, for example, the TX UE may transmit the entirety or part of the information described below to the RX UE(s) through a first SCI and/or a second SCI.

PSSCH (and/or PSCCH) related resource allocation information (e.g., the number/positions of time/frequency resources, resource reservation information (e.g., period))
SL CSI report request indicator or SL (L1) RSRP (and/or SL (L1) RSRQ and/or SL (L1) RSSI) report request indicator
SL CSI transmission indicator (or SL (L1) RSRP (and/or SL (L1) RSRQ and/or SL (L1) RSSI) information transmission indicator)) (on a PSSCH)
Modulation and coding scheme (MCS) information
Transmit power information
L1 destination ID information and/or L1 source ID information
SL HARQ process ID information
New data indicator (NDI) information
Redundancy version (RV) information
(Transmission traffic/packet related) QoS information (e.g., priority information)
SL CSI-RS transmission indicator or information on the number of (to-be-transmitted) SL CSI-RS antenna ports
Location information of the TX UE or location (or distance region) information of target RX UE(s) (for which SL HARQ feedback is requested)
Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in various embodiments of the present disclosure, for example, a TX UE may transmit SCI, first SCI and/or second SCI through PSCCH to an RX UE, PSCCH may be replaced/substituted with at least one of SCI, first SCI, and/or second SCI. And/or, for example, SCI may be replaced/replaced by PSCCH, first SCI and/or second SCI. And/or, for example, since a TX UE may transmit second SCI to an RX UE through PSSCH, the PSSCH may be replaced/substituted with second SCI.

Meanwhile, in the present disclosure, for example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

On the other hand, in various embodiments of the present disclosure, for example, "configuration" or "define" may mean (resource pool specific) (PRE)CONFIGURATION from a base station or network (via predefined signaling (e.g., SIB, MAC, RRC, etc.).

On the other hand, in the present disclosure, for example, an RLF may be determined based on an OUT-OF-SYNCH (OOS) indicator or an IN-SYNCH (IS) indicator, it can be replaced/replaced by OUT-OF-SYNCH (OOS) or IN-SYNCH (IS).

Meanwhile, in the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa.

For example, a code block group (CBG) may be replaced/substituted with a TB, or vice versa.

For example, a source ID may be replaced/substituted with a destination ID, or vice versa.

For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in various embodiments of the present disclosure, for example, a dynamic grant (DG) may be substituted/substituted with a configured grant (CG) and/or an SPS grant. For example, a dynamic grant may be substituted/replaced with a combination of a configured grant and an SPS grant. Alternatively, for example, a configured grant may be substituted/replaced with a type 1 configured grant or a type 2 configured grant.

Meanwhile, in various embodiments of the present disclosure, for example, a channel may be substituted/substituted with a signal.

Meanwhile, in various embodiments of the present disclosure, for example, a cast type may be substituted/substituted with unicast, groupcast, and/or broadcast.

Meanwhile, in the present disclosure, a resource may be replaced/substituted with a slot or a symbol, or vice versa.

Meanwhile, in various embodiments of the present disclosure, blind retransmission may mean an operation in which a TX UE performs retransmission without receiving SL HARQ feedback information from an RX UE. Also, for example, retransmission based on SL HARQ feedback may mean an operation in which a TX UE determines whether to perform retransmission based on SL HARQ feedback information received from an RX UE, and performs retransmission. Specifically, for example, when a TX UE performs SL HARQ feedback-based retransmission, when the TX UE receives NACK and/or DTX from an RX UE, retransmission may be performed to the RX UE.

On the other hand, in various embodiments of the present disclosure, time may be substituted/substituted with frequency.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

On the other hand, when performing sidelink communication, a method for a transmitting UE to reserve or pre-determine a transmission resource for a receiving UE may be based on, for example, embodiments of FIG. 12A, 12B, or 13 to be described later.

Figure 12A:
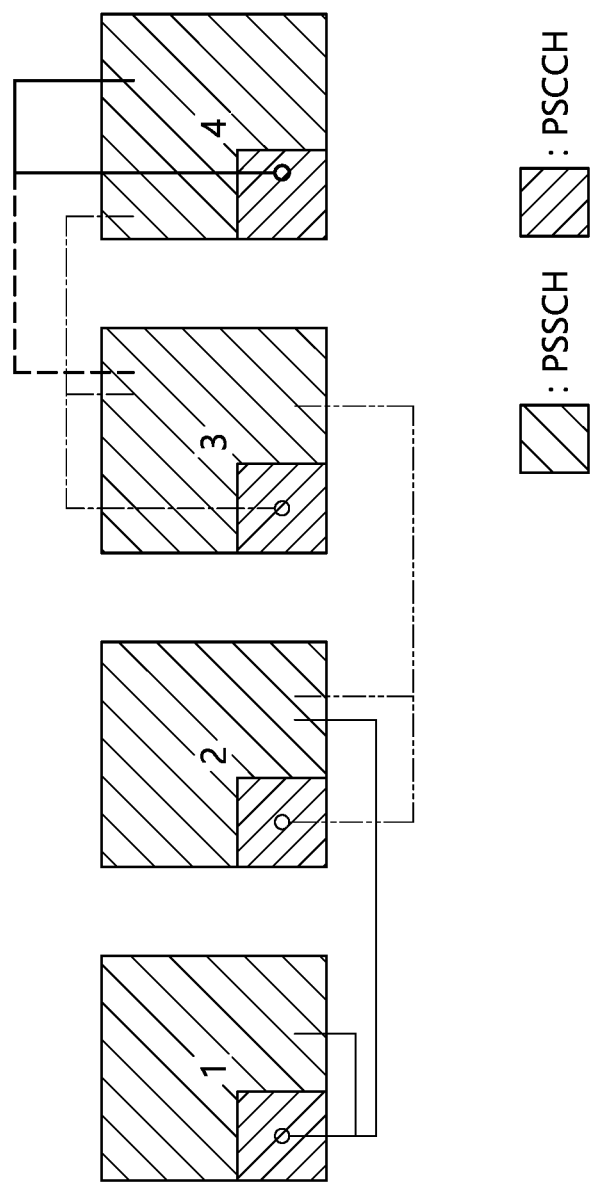
FIGS. 12A and 12B show an example of a chain-based resource reservation.
Figure 12B:
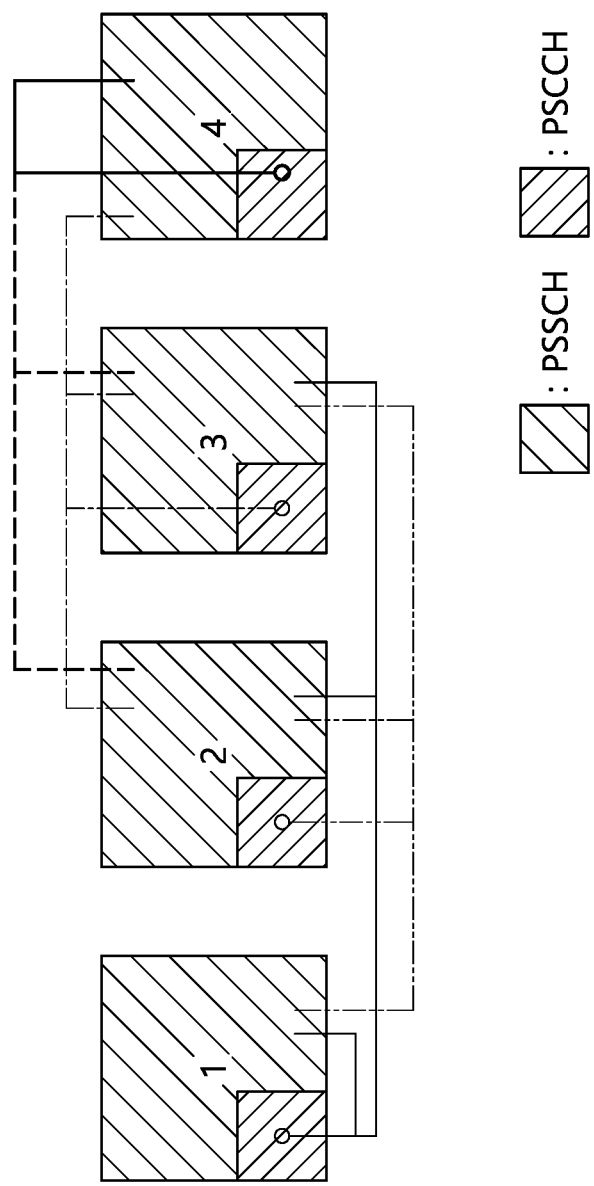

FIGS. 12A and 12B show an example of a chain-based resource reservation.

For example, a transmitting UE may perform a reservation of a transmission resource based on CHAIN. Specifically, for example, when a transmitting UE performs a reservation of K transmission resources, it may transmit or inform a receiving UE of location information of less than K transmission resources through SCI transmitted to the receiving UE at any (or specific) transmission time point or time resource. That is, for example, the SCI may include location information of less than the K transmission resources. Or, for example, when a transmitting UE performs reservation of K transmission resources related to a specific TB, it may inform or transmit location information of less than K transmission resources to a receiving UE through SCI transmitted to the receiving UE at any (or specific) transmission time point or time resource. That is, the SCI may include location information of less than the K transmission resources. In this case, for example, performance degradation due to excessive increase of SCI PAYLOAD can be prevented, by signaling only the location information of less than K transmission resources to a receiving UE through one SCI transmitted at any (or specific) transmission time point or time resource by the transmitting UE. Specifically, for example, in FIG. 12A, when the K value is 4 and a transmitting UE signals (maximum) two pieces of transmission resource location information to a receiving UE through one SCI, a method for the transmitting UE to perform CHAIN-based resource reservation is shown. Also, for example, in FIG. 12B, when the K value is 4 and (maximum) three pieces of transmission resource location information are signaled to a receiving UE through one SCI, a method for the transmitting UE to perform CHAIN-based resource reservation is shown. For example, only the fourth transmission-related resource location information may be transmitted/signaled to a receiving UE through the fourth (or last) transmission-related PSCCH transmitted by a transmitting UE in FIGS. 12A and 12B. And/or, for example, the third transmission-related resource location information may be additionally transmitted/signaled to a receiving UE through the fourth (or last) transmission-related PSCCH transmitted by a transmitting UE in FIG. 12A. And/or, for example, the second transmission and the third transmission-related resource location information transmitted by a transmitting UE through the fourth (or last) transmission-related PSCCH in FIG. 12B may be additionally transmitted/signaled to a receiving UE. At this time, for example, when only the fourth transmission-related resource location information is transmitted/signaled to the receiving UE through the fourth (or last) transmission-related PSCCH transmitted by the transmitting UE in FIGS. 12A and 12B, the transmitting UE may configure or designate a location information field/bit of an unused or remaining transmission resource to a pre-configured value (e.g., 0). Or, for example, when only the fourth transmission-related resource location information is transmitted/signaled to a receiving UE through the fourth (or last) transmission-related PSCCH transmitted by a transmitting UE in FIGS. 12A and 12B, a transmitting UE may configure or designate a location information field/bit of an unused or remaining transmission resource to indicate a pre-configured status/bit value indicating that it is the last transmission (out of four transmissions).

Figure 13:
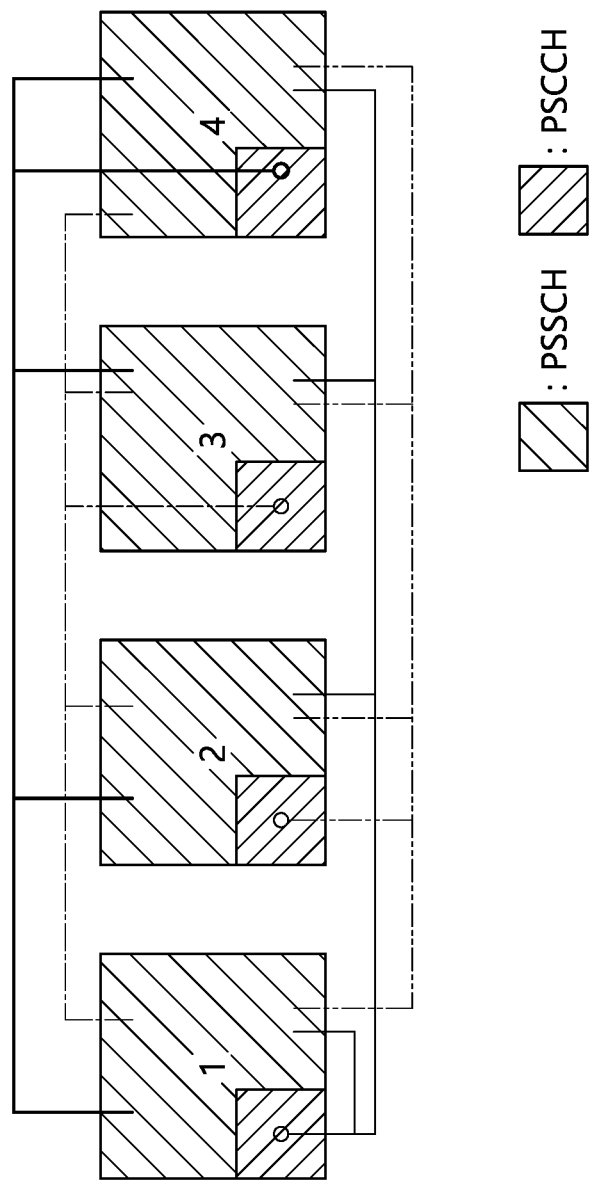
FIG. 13 shows an example of a block-based resource reservation.

FIG. 13 shows an example of a block-based resource reservation.

For example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, FIG. 13 shows a method for performing by the transmitting UE block-based resource reservation, by signaling location information of 4 transmission resources to receiving UE(s) through one SCI, in the case of a value of K=4.

Figure 14:
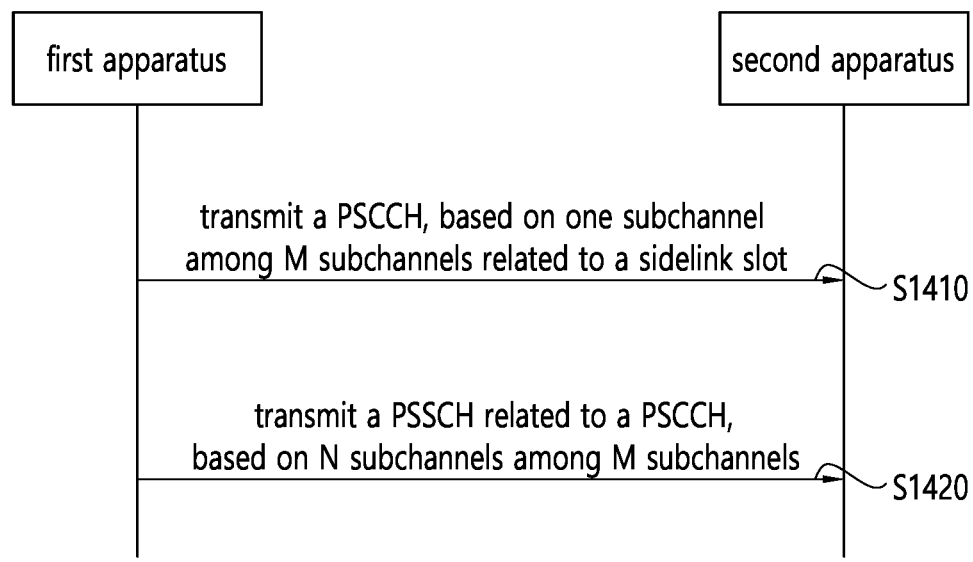
FIG. 14 is a flowchart showing a method for a first apparatus and a second apparatus to perform sidelink communication according to an embodiment.

FIG. 14 is a flowchart showing a method for a first apparatus and a second apparatus to perform sidelink communication according to an embodiment.

In one embodiment, a first apparatus shown in the flowchart of FIG. 14 may correspond to a first device of FIGS. 20 and 21 to be described later, and a second apparatus shown in the flowchart of FIG. 14 may correspond to a second device of FIGS. 20 and 21 to be described later.

In step S1410, a first apparatus according to an embodiment may transmit a physical sidelink control channel (PSCCH) to a second apparatus, based on one subchannel among M subchannels related to a sidelink slot. In step S1420, a first apparatus according to an embodiment may transmit a physical sidelink shared channel (PSSCH) related to the PSCCH to the second apparatus, based on N subchannels among the M subchannels. In one embodiment, the M subchannels and the N subchannels may be adjacent to each other on a frequency axis. In one embodiment, the one subchannel may be determined as one of a subchannel with the highest index or a subchannel with the lowest index among the N subchannels, based on at least one of the N, a transmission resource reservation period, PSSCH rank information, or modulation and coding scheme (MCS) information. Here, the N may be greater than or equal to 2, smaller than or equal to the M, and the M and the N may be a positive integer.

Hereinafter, various embodiments and examples directly or indirectly related to at least one of steps S1410 and S1420 will be reviewed.

In one example, when transmitting a PSSCH, if (linked) PSCCH transmission is performed only on a subchannel of the lowest index, among PSCCH candidate resources in a resource pool, a problem in which the probability of PSCCH transmission collision between different UEs is not uniform may occur. If decoding success probabilities for each PSCCH candidate resource are not similar (on average), it is difficult to efficiently support a service with a tight requirement (e.g., reliability, latency), so a method for mitigating this may be required.

In another example (or more specifically), PSCCH resource collision between TX UEs performing packet/message transmission may need to be avoided as much as possible for the following (some) reasons.

For example, if the probability of PSCCH decoding success is low (and/or unstable) due to high interference (and/or interference fluctuation), a service having relatively tight QoS requirements (e.g., higher reliability) may be difficult to support. In other words, as an example, when an RX UE fails to decode a PSSCH, a TX UE may perform retransmission (based on HARQ feedback information received from the RX UE), the RX UE can increase the PSSCH decoding success probability through the HARQ combining operation for the (received) initial transmission and retransmission, but the corresponding technique may not be applied to a PSCCH.

For example, different from a PSSCH, precoding (or beamforming) may not be applied to a PSCCH for reasons such as location change (and/or location ambiguity) of a target UE, sensing operation support (e.g., hidden node problem mitigation), etc., due to this, it may be (relatively) vulnerable to interference due to resource conflict.

For example, when a (RX UE) HARQ feedback operation is configured, in order for PSFCH transmission of an RX UE (e.g., including information on whether or not PSSCH decoding is successful) to be (stably) performed, the probability of PSCCH decoding success should be high. Here, for example, from a TX UE perspective, if PSFCH reception (from an RX UE) is made stably, a TX parameter (e.g., modulation and coding scheme (MCS), TX power, (time/frequency) resource size, etc.) may be effectively (or adaptively) adjusted, according to a (estimated) link quality/state change between a TX UE and an RX UE.

For example, after randomly selecting one of subchannels of the lowest/highest index used for PSSCH transmission, a PSCCH resource on the selected subchannel may be used.

For example, in the case of a subchannel of the upper half of a resource pool, a PSCCH resource position in a subchannel may be configured to a direction from an RB of the highest index to an RB of the lowest index, in the case of a subchannel of the lower half, a PSCCH resource position in a subchannel may be configured to a direction from an RB of the lowest index to an RB of the highest index.

For example, for PSCCH resource collision mitigation between different TX UEs, according to the (some) suggested rules below, it may be possible to select a PSCCH transmission resource. Here, for example, a PSCCH transmission resources may be limited in one subchannel (on a resource pool), and frequency/time resource size (e.g., the number of RB s/symbols) may be pre-configured from a network/base station (specifically for a resource pool and/or a service type/priority and/or a QOS requirement (e.g. reliability, latency)). For example, whether (some) rules of the present disclosure apply (and/or related parameters (e.g., PC_OFFSET) configurations) may be configured differently (or limitedly), specifically for chain (and/or block)-based resource reservation operation (and/or blind (and/or SL HARQ feedback-based) retransmission operation and/or configured grant (and/or dynamic grant) based resource selection/reservation operation and/or a resource pool and/or service a type/class and/or a service priority and/or a cast type and/or a destination UE and/or a (L1 or L2) destination (/source) ID and/or a (service) QoS parameter (e.g., reliability, latency, (target) BLER) and/or (resource pool) congestion level and/or a MODE type (e.g., MODE 1/2) and/or a grant type/type (e.g., configured grant, dynamic grant) and/or packet/message (e.g., TB) size and/or the number of subchannels used for PSSCH transmission (and/or the number of RBs related to PSCCH transmission) and/or the number of RBs constituting (one) subchannel and/or the number of subchannels (and/or RBs) constituting a resource pool).

[Proposal Rule 1]

In one embodiment, a PSCCH resource offset value (PC_OFFSET) may be determined/derived (according to a predefined function/rule) based on the following (partial) parameters. Here, for example, PC_OFFSET value may be interpreted as a (relative) offset/position value within a (plurality of) PSSCH-related subchannels (and/or RBs) (and/or resource pool related (plural) subchannels (and/or RBs)) scheduled by a PSCCH. Here, for example, a reference resource location to which a PC_OFFSET value applies may be configured as a subchannel (and/or RB) of the lowest (or highest) index (and/or pre-configured index/location). Here, for example, a PC_OFFSET value may be configured in units of a subchannel (and/or RB), among PSSCH-related a (plurality of) subchannel(s) (and/or RB(s)) scheduled by PSCCH (and/or a resource pool related a (plurality of) subchannel(s) (and/or RB(s))).

For example, PSCCH resource offset value (PC_OFFSET) (or a PSCCH-related subchannel) may be determined/derived (according to predefined functions/rules), based on (pre-configured) fields (combination) on 1st SCI (sidelink control information) (and/or 2nd SCI) (e.g., the number/locations of a subchannel (and/or RB) (and/or slot) related to a PSSCH transmission, the (reserved/selected) number of retransmission resources, QoS parameter fields (e.g., priority, minimum communication range), a transmission resource reservation period, PSSCH DMRS ANT PORT number/index (and/or PSSCH rank information)), MCS, (L1) source/destination ID, etc.

Here, for example, after taking a MODULO operation on a field (combination) related value with the number of a (plurality of) subchannel(s) (and/or RB(s)) (and/or a resource pool-related (plurality of) subchannel(s) (and/or RB(s))) (and/or a pre-configured value) related to a PSSCH scheduled by a PSCCH, the corresponding result value can be regarded as PC_OFFSET. Here, for example, "X MODULO Y" is a function that derives the remainder of dividing X by Y.

For example, a subchannel related to a PSCCH may be determined, based on the number of a subchannel(s) (and/or RB(s)) (and/or a resource pool-related (plurality of) subchannel(s) (and/or RB(s))) related to a PSSCH scheduled by a PSCCH.

Here, for example, a situation in which the number of subchannels on a sidelink slot in a resource pool is configured to three may be assumed.

In this case, in one embodiment, when a TX UE performs PSSCH transmission using one subchannel (e.g., selectable among subchannel 1, subchannel 2, and subchannel 3 (or a first subchannel, a second subchannel, and a third subchannel)), a (linked) PSCCH transmission may be performed may be performed through a pre-configured number/position of RBs in the (same) subchannel on which PSSCH transmission is performed.

In this case, in one embodiment, when a TX UE performs PSSCH transmission using two subchannels (e.g., it may be selectable among subchannel 1/2, subchannel 2/3), a (linked) PSCCH transmission may be performed through the pre-configured number/position of RBs on a pre-configured subchannel (e.g., relatively (lowest) low (or high) subchannel index), among subchannels through which a PSSCH transmission is performed.

In this case, in one embodiment, when a TX UE performs PSSCH transmission using three subchannels (e.g., subchannel 1/2/3), a (linked) PSCCH transmission may be performed through the pre-configured number/position of RBs on a (pre-configured) subchannel (e.g., subchannel 1 (first subchannel) or subchannel 3 (third subchannel)) that are relatively unused for PSCCH transmission purposes in a PSSCH transmission using one/two subchannels, among subchannels through which a PSSCH transmission is performed. Here, for example, when PSSCH transmission using one/two subchannels, if there are a plurality of subchannels that are relatively unused for PSCCH transmission, a TX UE may randomly select one of them, and/or may preferentially select one with relatively little interference (e.g., using a (PSCCH) RSRP/RSSI measurement value) (on a PSCCH resource region), and/or may preferentially select one used for transmission of packets/messages of relatively low priority.

In another example, under the situation where the number of subchannels on a sidelink slot in a resource pool is configured to 3, when a TX UE performs PSSCH transmission using one subchannel based on subchannel 1 (or a first subchannel), a (linked) PSCCH transmission may be performed through a pre-configured number/position of RBs in a (same) subchannel (e.g., subchannel 1) on which PSSCH transmission is performed.

Alternatively, when PSSCH transmission is performed using two subchannels, a (linked) PSCCH transmission may be performed through the pre-configured number/position of RBs on a (pre-configured) subchannel (e.g., relatively (lowest) (or high) subchannel index), among the subchannels on which PSSCH transmission is performed (e.g., subchannel 1/2).

Alternatively, when PSSCH transmission is performed using three subchannels, a (linked) PSCCH transmission may be performed through the pre-configured number/position of RBs on a (pre-configured) subchannel (e.g., subchannel 3) that is relatively unused for PSCCH transmission purposes when transmitting PSSCH using one/two subchannels, among subchannels on which PSSCH transmission is performed.

[Proposal Rule 2]

In one embodiment, when the embodiment (for example, the [Proposed Rule 1]) is applied, a (relative) PSCCH resource location in a (plurality of) subchannel(s) (and/or RB(s)) (and/or a (plurality of) subchannel(s) (and/or RB(s)) related to a resource pool) related to a PSSCH scheduled by a PSCCH, may be limited to one of a subchannel (and/or RB) (set) at both ends (or a pre-configured number) (e.g., a FDMed PSSCH RB (and/or subchannel) can be made to be continuous (on the frequency resource domain), through this, it is possible to alleviate the problem that PSSCH DMRS is stopped (or cut off) by PSCCH (resources) (on the frequency resource domain) (that is, PSSCH-related channel estimation performance can be improved))

Here, for example, the above rule may be limitedly applied only when PSSCH DMRS transmission is performed/configured on a resource region FDMed with a PSCCH.

For example, PSSCH transmission may be limitedly configured within an RB (and/or subchannel) (set) (of a pre-configured granularity) in which the same precoding (or beamforming) application is assumed.

For example, a specific subchannel (and/or RB) (set) (e.g., a subchannel (and/or RB) of the lowest (or highest) (or random) index/location) may be pre-configured.

For example, because of UE (RF) capability limitation (and/or self-interference problem), it may be difficult for a UE to simultaneously perform NR SL TX and LTE SL TX and/or NR SL TX and LTE SL RX (and/or LTE SL TX and NR SL RX) in the time resource domain. Here, for example, NR SL communication and LTE SL communication may be performed through different (adjacent) channels within an intra-band. For example, the proposal rule below proposes assistance information that a UE reports to a base station (ASS_INFO), under the situation that a mode in which the SL transmission resource is scheduled (directly) by a base station (within a pre-configured resource pool) (e.g., LTE MODE 3, NR MODE 1) and a mode in which a UE independently selects an SL transmission resource within a pre-configured resource pool (e.g., LTE MODE 4, NR MODE 2) are simultaneously performed, in order to mitigate overlap/collision (in the time domain) between the two mode-related SL transmission resources. Here, for example, it may be interpreted as transmitting ASS_INFO to the gNB when a UE performs NR MODE1 and LTE MODE 4 at the same time, and may be interpreted as transmitting ASS_INFO to an eNB when a UE performs LTE MODE 3 and NR MODE 2 at the same time. Here, for example, if the proposal rule below is applied, a base station may schedule a MODE 1 (or MODE 3) transmission resource, considering ASS_INFO received from a UE, so as not to overlap (as much as possible) with a MODE 1 (or MODE 3) transmission resource (selected/reserved by a UE).

For example, based on information on how many LTE MODE 4 (and/or NR MODE 2) transmission resources are left (until the point of deciding whether to perform reselection/reservation) selected/reserved by a UE (and/or information about how much of the counter value related to the number of allowed transmissions for selected/reserved LTE MODE 4 (and/or NR MODE 2) transmission resource-based message/packet (e.g., MAC PDU, TB) is left).

For example, based on the (remaining or current) timer value related to selected/reserved LTE MODE 4 (and/or NR MODE 2) transmission resource (allowed) usage, a PSCCH transmission resource may be determined.

For example, based on (the highest (or lowest) or average) service/traffic priority information (and/or service/traffic priority information assumed when operating sensing operation for LTE MODE 4 (and/or NR MODE 2) transmission resource selection/reservation and/or (the highest (or lowest) or average)) service/traffic priority information related to a selected/reserved LTE MODE 4 (and/or NR MODE 2) transmission resource) allowed on an LTE MODE 4 (and/or NR MODE 2) (transmission) resource pool, a PSCCH transmission resource may be determined.

For example, based on service/traffic priority information (and/or service/traffic priority information assumed when operating sensing operation for LTE MODE 4 transmission resource selection/reservation and/or service/traffic priority information related to a selected/reserved LTE MODE 4 transmission resource) allowed on an LTE MODE 4 resource pool, a PSCCH transmission resource may be determined.

Figure 15:
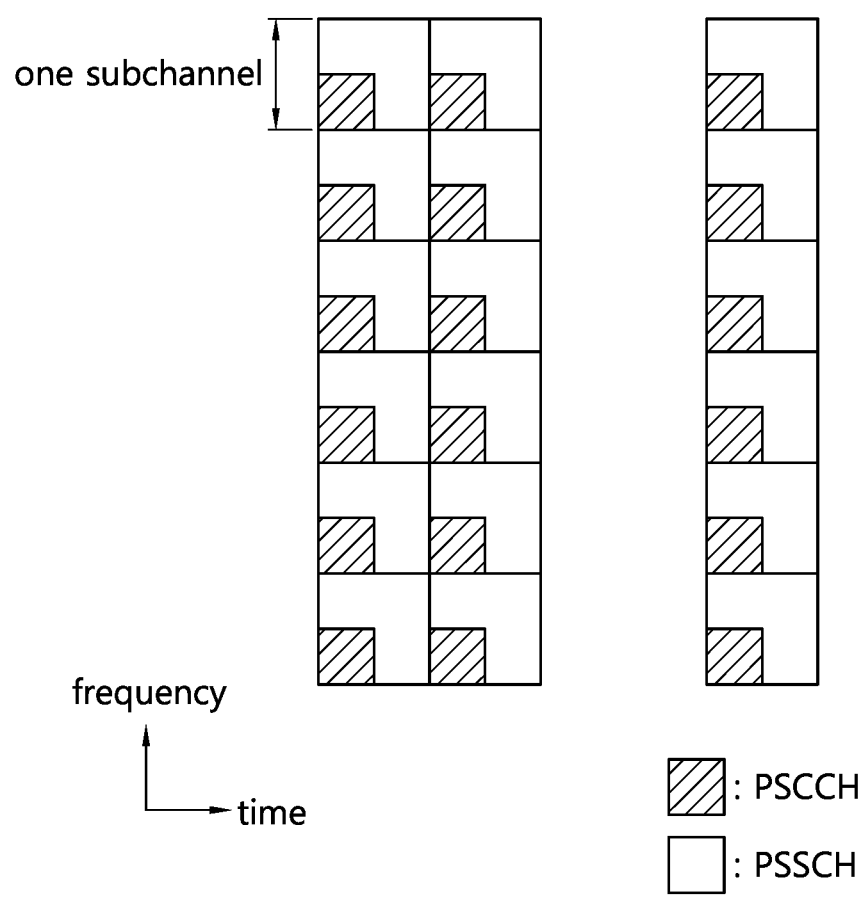
FIG. 15 shows an example of resource allocation for transmission of PSCCH and PSSCH.

FIG. 15 shows an example of resource allocation for transmission of PSCCH and PSSCH.

For example, it may be efficient for a TX UE to transmit a PSSCH using contiguous RBs. For example, it may be efficient for a TX UE to transmit a PSSCH using contiguous RBs in the frequency domain.

For example, when a TX UE transmits a PSSCH using a discontinuous and/or distributed RB (in a frequency domain), a TX UE may have to transmit a PSSCH using a high maximum power reduction (MPR) value. For example, in comparison with the case in which a TX UE transmits a PSSCH using a continuous RB, when a TX UE transmits a PSSCH using a discontinuous and/or distributed RB (in a frequency domain), a TX UE may have to transmit a PSSCH using a relatively high MPR value, to meet pre-configured emission requirements. Due to this, PSSCH transmission power of a TX UE may be (relatively) low, and a problem in which a link budget and/or coverage related to PSSCH transmission is reduced may occur.

For example, when a TX UE transmits a PSSCH using a discontinuous and/or distributed RB (in a frequency domain), interference due to in-band emission on PSSCH and/or PSCCH transmitted/received by other UEs (in the frequency domain) may be increased. For example, when a TX UE transmits a PSSCH in FDM form using discontinuous and/or distributed (in a frequency domain) RBs, interference on PSSCH and/or PSCCH transmitted and received by other UEs may increase.

For example, in order to alleviate the above-mentioned problem, a resource pool may be configured for a TX UE according to some or all of the proposed rules below. Here, for example, a TX UE may configure a resource for PSCCH transmission (hereinafter, PSCCH transmission resource) by limiting it to one subchannel (in resource pool) (with continuous RB). Also, for example, a frequency resource size and/or a time resource size (e.g., the number of RBs and/or the number of symbols) may be pre-configured for a TX UE from a network/base station. For example, a network/base station may configure or pre-configure the frequency resource size and/or the time resource size to a TX UE per resource pool. And/or, for example, a network/base station may configure or pre-configure the frequency resource size and/or the time resource size to a TX UE per service type. And/or, for example, a network/base station may configure or pre-configure the frequency resource size and/or the time resource size to a TX UE per service priority. And/or, for example, a network/base station may configure or pre-configure the frequency resource size and/or the time resource size to a TX UE per QoS requirement (e.g., reliability and/or latency).

For example, a UE may determine whether to apply at least one of the rules restricted according to various embodiments of the present disclosure, according to whether a UE performs a chain-based resource reservation operation. And/or, for example, a UE may determine whether to apply at least one of the rules restricted according to various embodiments of the present disclosure, according to whether a UE performs a block-based resource reservation operation. And/or, for example, a UE may determine whether to apply at least one of the rules restricted according to various embodiments of the present disclosure, according to whether a UE performs a blind retransmission operation. And/or, for example, a UE may determine whether to apply at least one of the rules restricted according to various embodiments of the present disclosure, according to whether a UE performs a retransmission operation based on SL HARQ feedback. And/or, for example, a UE may determine whether to apply at least one of the rules restricted according to various embodiments of the present disclosure, according to whether a UE performs a resource selection/reservation operation based on a configured grant. And/or, for example, a UE may determine whether to apply at least one of the rules restricted according to various embodiments of the present disclosure, according to whether a UE performs resource selection/reservation operation based on a dynamic grant.

And/or, for example, whether a UE applies at least one rule among rules proposed according to various embodiments of the present disclosure may be configured differently or limitedly for a UE per resource pool. And/or, for example, whether a UE applies at least one rule among rules proposed according to various embodiments of the present disclosure may be configured differently or limitedly for a UE per service type. And/or, for example, whether a UE applies at least one rule among rules proposed according to various embodiments of the present disclosure may be configured differently or limitedly for a UE per service priority. And/or, for example, whether a UE applies at least one rule among rules proposed according to various embodiments of the present disclosure may be configured differently or limitedly for a UE per cast type. For example, a cast type may include at least one of unicast, groupcast, and/or broadcast. And/or, for example, whether a UE applies at least one rule among rules proposed according to various embodiments of the present disclosure may be configured differently or limitedly for a UE per destination UE. And/or, for example, whether a UE applies at least one rule among rules proposed according to various embodiments of the present disclosure may be configured differently or limitedly for a UE per (L1 or L2) destination ID. And/or, for example, whether a UE applies at least one rule among rules proposed according to various embodiments of the present disclosure may be configured differently or limitedly for a UE per (L1 or L2) source ID. And/or, for example, whether a UE applies at least one rule among rules proposed according to various embodiments of the present disclosure may be configured differently or limitedly for a UE per (service) QoS parameter. For example, a (service) QoS parameter may include at least one of a reliability-related parameter, a delay-related parameter, and/or a (target) BLER-related parameter. And/or, for example, whether a UE applies at least one rule among rules proposed according to various embodiments of the present disclosure may be configured differently or limitedly for a UE per resource pool congestion level. And/or, for example, whether a UE applies at least one rule among rules proposed according to various embodiments of the present disclosure may be configured differently or limitedly for a UE per SL MODE type. For example, an SL MODE type may include SL MODE 1 and/or SL MODE 2. And/or, for example, whether a UE applies at least one rule among rules proposed according to various embodiments of the present disclosure may be configured differently or limitedly for a UE per grant type. For example, a grant type may include a configured grant and/or a dynamic grant. And/or, for example, whether a UE applies at least one rule among rules proposed according to various embodiments of the present disclosure may be configured differently or limitedly for a UE per packet/message (e.g., TB) size. And/or, for example, whether a UE applies at least one rule among rules proposed according to various embodiments of the present disclosure may be configured differently or limitedly for a UE per the number of subchannels used by a UE to transmit a PSSCH. And/or, for example, whether a UE applies at least one rule among rules proposed according to various embodiments of the present disclosure may be configured differently or limitedly for a UE per the number of RBs a UE uses for transmitting a PSCCH. And/or, for example, whether a UE applies at least one rule among rules proposed according to various embodiments of the present disclosure may be configured differently or limitedly for a UE per the number of RBs constituting (one) subchannel And/or, for example, whether a UE applies at least one rule among rules proposed according to various embodiments of the present disclosure may be configured differently or limitedly for a UE per the number of subchannels constituting a resource pool and/or the number of RBs constituting a resource pool. And/or, for example, whether a UE applies at least one rule among rules proposed according to various embodiments of the present disclosure may be configured differently or limitedly for a UE, according to whether a (one) subchannel size and a PSCCH (frequency) resource size are the same.

For example, a parameter may be configured differently or limitedly for a UE, according to whether a UE performs a chain-based resource reservation operation. And/or, for example, a parameter may be configured differently or limitedly for a UE, according to whether a UE performs a block-based resource reservation operation. And/or, for example, a parameter may be configured differently or limitedly for a UE, according to whether a UE performs a blind retransmission operation. And/or, for example, a parameter may be configured differently or limitedly for a UE, according to whether a UE performs a retransmission operation based on SL HARQ feedback. And/or, for example, a parameter may be configured differently or limitedly for a UE, according to whether a UE performs a resource selection/reservation operation based on a configured grant. And/or, for example, a parameter may be configured differently or limitedly for a UE, according to whether a UE performs resource selection/reservation operation based on a dynamic grant.

And/or, for example, a parameter may be configured differently or limitedly for a UE per resource pool. And/or, for example, a parameter may be configured differently or limitedly for a UE per service type. And/or, for example, a parameter may be configured differently or limitedly for a UE per service priority. And/or, for example, a parameter may be configured differently or limitedly for a UE per cast type. For example, a cast type may include at least one of unicast, groupcast, and/or broadcast. And/or, for example, a parameter may be configured differently or limitedly for a UE per destination UE. And/or, for example, a parameter may be configured differently or limitedly for a UE per (L1 or L2) destination ID. And/or, for example, a parameter may be configured differently or limitedly for a UE per (L1 or L2) source ID. And/or, for example, a parameter may be configured differently or limitedly for a UE per (service) QoS parameter. For example, a (service) QoS parameter may include at least one of a reliability-related parameter, a delay-related parameter, and/or a (target) BLER-related parameter. And/or, for example, a parameter may be configured differently or limitedly for a UE per resource pool congestion level. And/or, for example, a parameter may be configured differently or limitedly for a UE per SL MODE type. For example, an SL MODE type may include SL MODE 1 and/or SL MODE 2. And/or, for example, a parameter may be configured differently or limitedly for a UE per grant type. For example, a grant type may include a configured grant and/or a dynamic grant. And/or, for example, a parameter may be configured differently or limitedly for a UE per packet/message (e.g., TB) size. And/or, for example, a parameter may be configured differently or limitedly for a UE per the number of subchannels used by a UE to transmit a PSSCH. And/or, for example, a parameter may be configured differently or limitedly for a UE per the number of RBs a UE uses for transmitting a PSCCH. And/or, for example, a parameter may be configured differently or limitedly for a UE per the number of RBs constituting (one) subchannel And/or, for example, a parameter may be configured differently or limitedly for a UE per the number of subchannels constituting a resource pool and/or the number of RBs constituting a resource pool. And/or, for example, a parameter may be configured differently or limitedly for a UE, according to whether a (one) subchannel size and a PSCCH (frequency) resource size are the same.

According to an embodiment of the present disclosure, in order to alleviate the problem of PSCCH resource collision between different TX UEs, a TX UE may randomly select any one of "a subchannel with the highest index (e.g., a subchannel located at the top in the frequency domain)" or a subchannel with the lowest index (e.g., the lowest subchannel in the frequency domain) which it may use to transmit a PSSCH. And, a TX UE may transmit SCI (For example, a control channel through which scheduling information related to PSSCH transmission is transmitted) by using a PSCCH resource in the selected subchannel. For convenience of description, such a case may be referred to as OPTION A.

However, for example, according to the OPTION A method, if a resource pool configuration is the same as in FIG. 15, for example, when the PSCCH (frequency) resource size is configured smaller than the one subchannel (frequency) resource size, there may be a problem in that an RB used by a TX UE for PSSCH transmission cannot be continuously maintained in the frequency domain. For example, when a resource pool configuration is as shown in FIG. 16 below, for example, when the size of one subchannel (frequency) resource and the PSCCH (frequency) resource size are configured to be the same, a problem like this can be solved.

Figure 16:
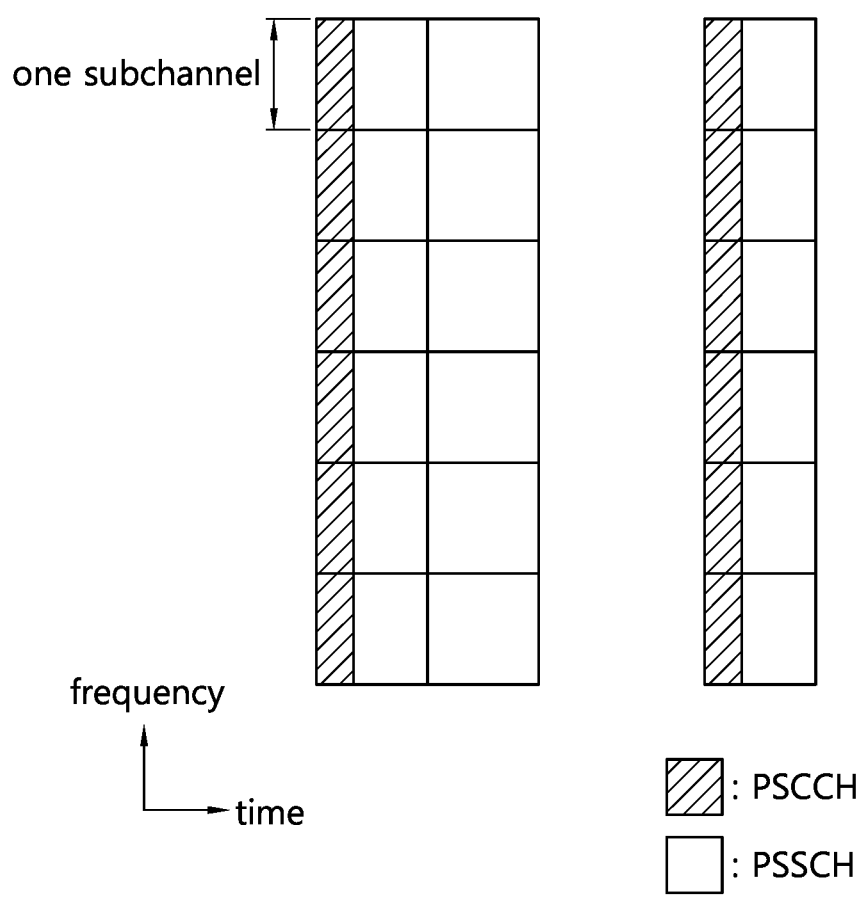
FIG. 16 shows another example of resource allocation for transmission of PSCCH and PSSCH.

FIG. 16 shows another example of resource allocation for transmission of PSCCH and PSSCH.

For example, a TX UE may select a PSCCH resource according to the OPTION A method only when the size of one subchannel (frequency) resource and the PSCCH (frequency) resource size are configured to be the same. Here, for example, in this case, a TX UE may transmit a pre-configured field (e.g., 1 bit) on SCI to an RX UE, an RX UE may determine the direction of a scheduled PSSCH subchannel (by a TX UE) based on a pre-configured field. And/or, for example, a TX UE may transmit a PSCCH DMRS sequence index and/or a PSSCH DMRS sequence index to an RX UE, an RX UE may determine the direction of a scheduled PSSCH subchannel (by a TX UE) based on a PSCCH DMRS sequence index and/or a PSSCH DMRS sequence index. For convenience of description, a field pre-configured on SCI, a PSCCH DMRS sequence index, and/or a PSSCH DMRS sequence index may be referred to as DIR_INDI.

On the other hand, for example, when the size of one subchannel (frequency) resource and a PSCCH (frequency) resource size are not configured to be the same, and/or when a TX UE is not allowed/configured to select a PSCCH resource according to OPTION A, a field/indicator such as DIR_INDI may be unnecessary. That is, DIR_INDI may appear or exist selectively.

Figure 17:
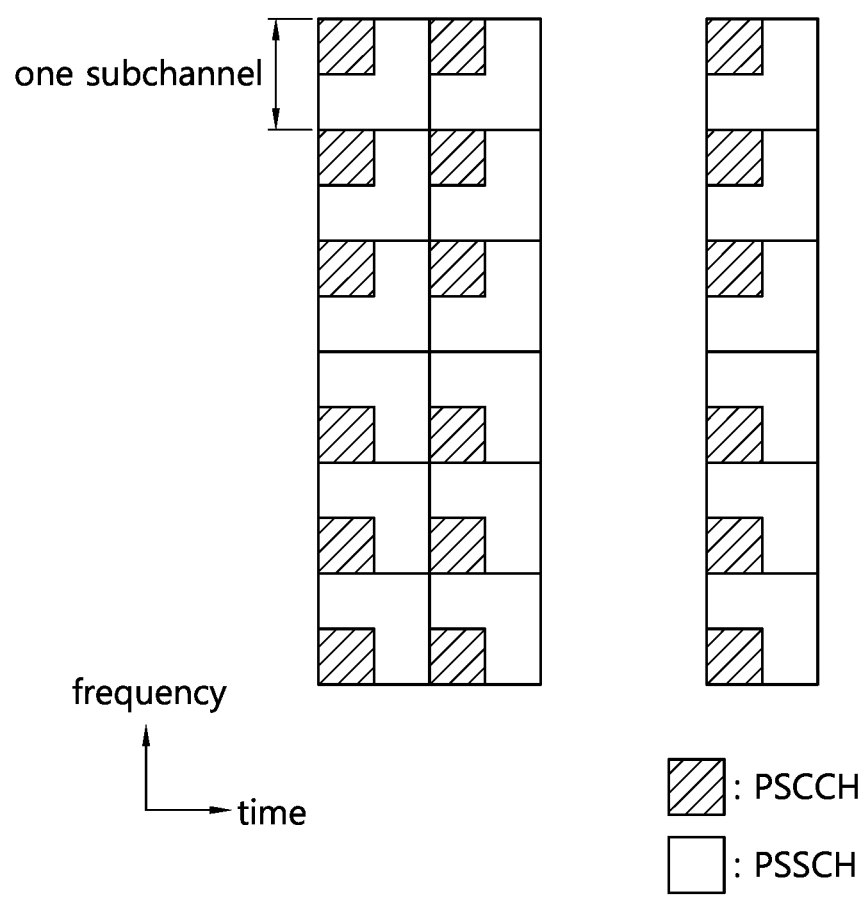
FIG. 17 shows another example of resource allocation for transmission of PSCCH and PSSCH.

FIG. 17 shows another example of resource allocation for transmission of PSCCH and PSSCH.

For example, not limited to a case where the size of one subchannel (frequency) resource and the PSCCH (frequency) resource size are configured to be the same, in order for a TX UE to select/determine a PSCCH resource according to the OPTION A scheme, resource pool configuration may be performed according to the following (partial) rules. Here, for example, for convenience of description, it is assumed that a PSCCH (frequency) resource is configured to "X" (consecutive) RBs.

For example, according to the subchannel position, the PSCCH (frequency) resource position may be configured differently in a subchannel. For example, according to the subchannel position, a TX UE may configure/determine the PSCCH (frequency) resource position differently in a subchannel. For example, referring to FIG. 17, on a subchannel of the upper half of all subchannels on a slot in a resource pool, a TX UE may configure/determine X RBs as PSCCH (frequency) resources in the direction from an RB related to the highest index to an RB related to the lowest index in the subchannel. For example, on the lower half of all subchannels on a slot in a resource pool, a TX UE may configure/determine X RBs as PSCCH (frequency) resources in the direction from an RB related to the lowest index to an RB related to the highest index in a subchannel. Here, for example, when a (relatively) large number of subchannels are mainly used for PSSCH transmission, according to the rule, a PSCCH transmission resource between different TX UEs can be efficiently randomized. For example, in the case of large packet and/or message transmission, according to the rule, a PSCCH transmission resource between different TX UEs can be efficiently randomized.

Figure 18:
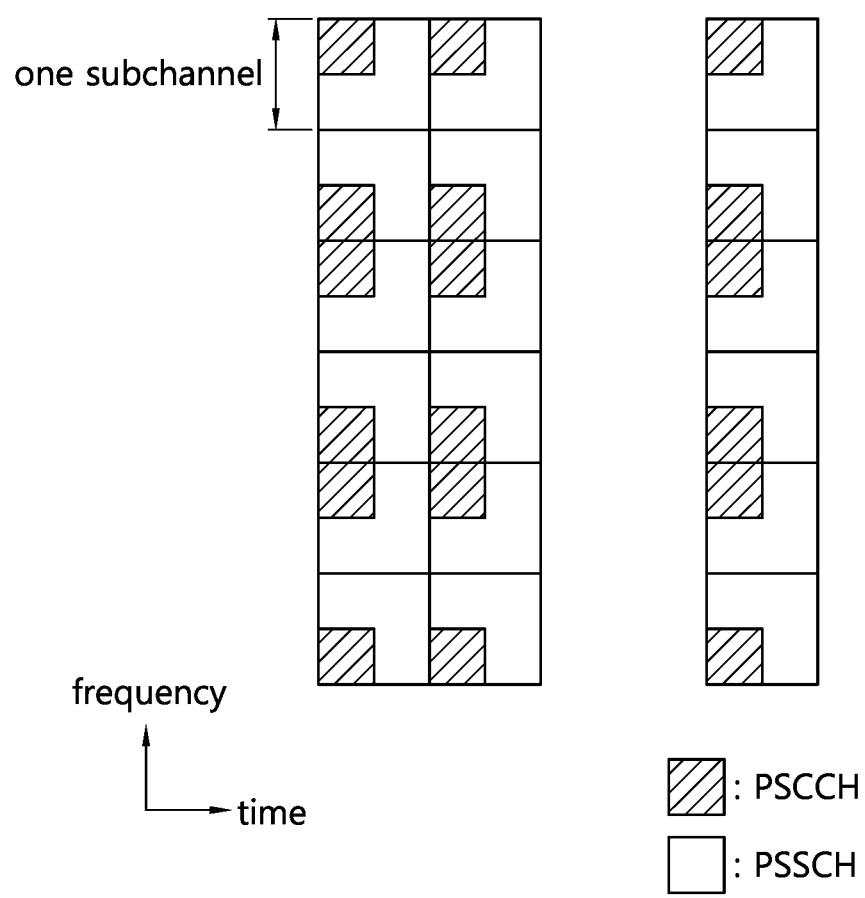
FIG. 18 shows another example of resource allocation for transmission of PSCCH and PSSCH.

FIG. 18 shows another example of resource allocation for transmission of PSCCH and PSSCH.

For example, according to a subchannel position, a PSCCH (frequency) resource position may be configured differently in a subchannel. For example, according to a subchannel position, a TX UE may configured/determine a PSCCH (frequency) resource position differently in a subchannel. For example, referring to FIG. 18, on a subchannel related to result value 1 among all subchannels on a slot in a resource pool, a TX UE may configure/determine X RBs as PSCCH (frequency) resources in the direction from an RB related to the highest index to an RB related to the lowest index in a subchannel. For example, on a subchannel related to result value 0 among all subchannels on a slot in a resource pool, a TX UE may configure/determine X RBs as PSCCH (frequency) resources in the direction from an RB related to the lowest index to an RB related to the highest index in a subchannel. For example, a result value may be obtained by Equation 1 below.

$$\text{result value} = \text{"subchannel index"} \text{ MODULO } \text{"2"} \quad \text{[Equation 1]}$$

For example, "W MODULO Z" may be a function that derives the remainder of dividing W by Z. For example, 2 in Equation 1 may be pre-configured for a TX UE. For example, when a subchannel index is 5, a result value may be 1. For example, on a subchannel having a subchannel index of 5 among all subchannels on a slot in a resource pool, a TX UE may configure/determine X RBs as PSCCH (frequency) resources in the direction from an RB related to the highest index to an RB related to the lowest index in a subchannel. Here, for example, when a (relatively) small number of subchannels are mainly used for PSSCH transmission, according to the rule, a PSCCH transmission resource between different TX UEs can be efficiently randomized. For example, in the case of small packet and/or message transmission, according to the rule, a PSCCH transmission resource between different TX UEs can be efficiently randomized.

For example, on a subchannel having a result value of "1", X PSCCH (frequency) resource locations may be configured in the direction from an RB with the highest index to an RB with the lowest index in a subchannel.

For example, on a subchannel having a result value of "0", X PSCCH (frequency) resource locations may be configured in the direction from an RB with the lowest index to an RB with the highest index in a subchannel Here, for example, when a (relatively) small number of subchannels are mainly used for PSSCH transmission (e.g., small packet/message transmission), this rule can efficiently achieve randomization of PSCCH transmission resources between different TX UEs.

Figure 19:
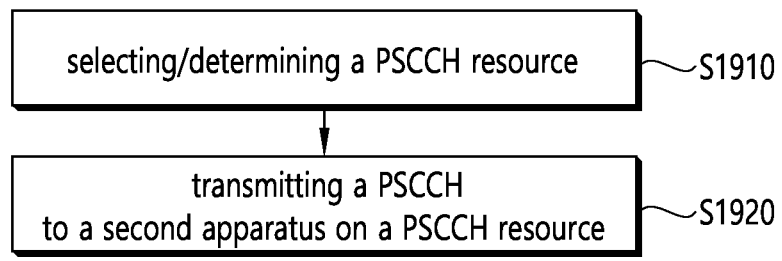
FIG. 19 shows a method for a first apparatus to transmit a PSCCH according to an exemplary embodiment of the present disclosure.

FIG. 19 shows a method for a first apparatus to transmit a PSCCH, according to an embodiment of the present disclosure.

The embodiment of FIG. 19 may be combined with various methods and/or procedures proposed according to various embodiments of the present disclosure.

Referring to FIG. 19, in step S1910, a first apparatus may select/determine a PSCCH resource. For example, a PSCCH resource may be a resource for a first apparatus to transmit a PSCCH. For example, a first apparatus may select a PSCCH resource according to various embodiments of the present disclosure. For example, a first apparatus may determine/obtain an offset value related to a PSCCH resource. For example, according to various embodiments of the present disclosure, a first apparatus may determine/obtain an offset value related to a PSCCH resource. For example, a first apparatus may determine/select a PSCCH resource according to a subchannel. For example, a first apparatus may determine/select a PSCCH resource according to various embodiments of the present disclosure.

In step S1920, a first apparatus may transmit a PSCCH to a second apparatus on a PSCCH resource. For example, a first apparatus may transmit sidelink control information to a second apparatus through a PSCCH. For example, a first apparatus may transmit a 1st SCI to a second apparatus through a PSCCH. For example, a first apparatus may transmit a 1st SCI and/or a 2nd SCI to a second apparatus through a PSCCH. For example, a first apparatus may transmit a SCI to a second apparatus using a PSCCH resource.

Figure 20:
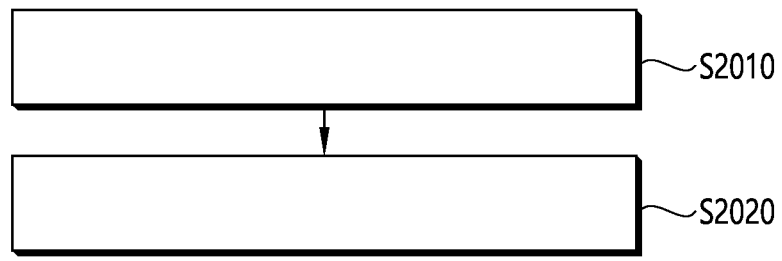
FIG. 20 is a flowchart showing an operation of a first apparatus according to an embodiment of the present disclosure.

FIG. 20 is a flowchart showing an operation of a first apparatus according to an embodiment of the present disclosure.

Operations disclosed in the flowchart of FIG. 20 may be performed in combination with various embodiments of the present disclosure. In one example, operations disclosed in the flowchart of FIG. 20 may be performed based on at least one of devices illustrated in FIGS. 22 to 27. In one example, a first apparatus of FIG. 20 may correspond to a first wireless apparatus 100 of FIG. 23 to be described later. In another example, a first apparatus of FIG. 20 may correspond to a second wireless apparatus 200 of FIG. 23 to be described later.

In step S2010, a first apparatus according to an embodiment may transmit a physical sidelink control channel (PSCCH) to a second apparatus, based on one subchannel among M subchannels related to a sidelink slot.

In step S2020, a first apparatus according to an embodiment may transmit a physical sidelink shared channel (PSSCH) related to the PSCCH to the second apparatus, based on N subchannels among the M subchannels.

In one embodiment, the M subchannels and the N subchannels may be adjacent to each other on a frequency axis.

In one embodiment, the one subchannel may be determined as one of a subchannel with the highest index or a subchannel with the lowest index among the N subchannels, based on at least one of the N, a transmission resource reservation period, PSSCH rank information, or modulation and coding scheme (MCS) information.

In one embodiment, the N may be greater than or equal to 2, smaller than or equal to the M, and the M and the N may be a positive integer.

In one embodiment, the PSCCH may be transmitted based on a pre-configured number of resource blocks (RBs) and a pre-configured resource location within a subchannel through which the PSSCH is transmitted, based on the N is 1.

In one embodiment, the one subchannel may be determined as the subchannel with the lowest index among the N subchannels, based on the N is 2.

In one embodiment, the one subchannel may be determined as the subchannel with the highest index among the N subchannels, based on the N is 2.

In one embodiment, the one subchannel may be determined as the subchannel with the lowest index among the N subchannels, based on the N is 3.

In one embodiment, the one subchannel may be determined as the subchannel with the highest index among the N subchannels, based on the N is 3.

In one embodiment, the PSCCH may be transmitted based on a pre-configured number of RBs and a pre-configured resource location within a subchannel through which the PSSCH is transmitted, based on the N is 1, the one subchannel may be determined as the subchannel with the lowest index among the N subchannels, based on the N is 2, the one subchannel may be determined as the subchannel with the highest index among the N subchannels, based on the N is 3.

In one embodiment, the PSCCH may be transmitted based on a pre-configured number of RBs and a pre-configured resource location within a subchannel through which the PSSCH is transmitted, based on the N is 1, the one subchannel may be determined as the subchannel with the highest index among the N subchannels, based on the N is 2, the one subchannel may be determined as the subchannel with the lowest index among the N subchannels, based on the N is 3.

In one embodiment, the one subchannel may be determined as the subchannel with the highest index among the N subchannels, based on the N is 4.

In one embodiment, the one subchannel may be determined as the subchannel with the lowest index among the N subchannels, based on the N is 4.

In one embodiment, the one subchannel may be determined based on a PSCCH subchannel index offset related to a subchannel for transmission of the PSCCH. Here, the PSCCH subchannel index offset may be determined based on at least one of the N, the transmission resource reservation period, the PSSCH rank information, or the MCS information.

In one embodiment, the one subchannel may be determined as one of the subchannel with the highest index or the subchannel with the lowest index among the N subchannels, based on at least one of the N, the transmission resource reservation period, the PSSCH rank information, or the MCS information, included in first sidelink control information (SCI) related to the PSCCH.

According to an embodiment of the present disclosure, a first apparatus for performing wireless communication may be proposed. The first apparatus may comprise: one or more memories storing instructions; one or more transceivers; and one or more processors connected to the one or more memories and the one or more transceivers, wherein the one or more processors execute the instructions to: transmit a physical sidelink control channel (PSCCH) to a second apparatus, based on one subchannel among M subchannels related to a sidelink slot; and transmit a physical sidelink shared channel (PSSCH) related to the PSCCH to the second apparatus, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

According to an embodiment of the present disclosure, an apparatus (or a chip(set)) configured to control a first user equipment (UE) may be proposed. The apparatus may comprise: one or more processors; and one or more memories operably connectable to the one or more processors and storing instructions, wherein the one or more processors execute the instructions to: transmit a physical sidelink control channel (PSCCH) to a second UE, based on one subchannel among M subchannels related to a sidelink slot; and transmit a physical sidelink shared channel (PSSCH) related to the PSCCH to the second UE, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

In one example, the first UE of the embodiment may refer to a first apparatus described in the present disclosure. In one example, each of the at least one processor and the at least one memory in the apparatus for controlling the first UE may be implemented as a separate sub-chip, alternatively, at least two or more components may be implemented through one sub-chip.

According to an embodiment of the present disclosure, a non-transitory computer-readable storage medium storing instructions (or commands) may be proposed. The instructions, when executed, may cause a first apparatus to: transmit a physical sidelink control channel (PSCCH) to a second apparatus, based on one subchannel among M subchannels related to a sidelink slot; and transmit a physical sidelink shared channel (PSSCH) related to the PSCCH to the second apparatus, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

Figure 21:
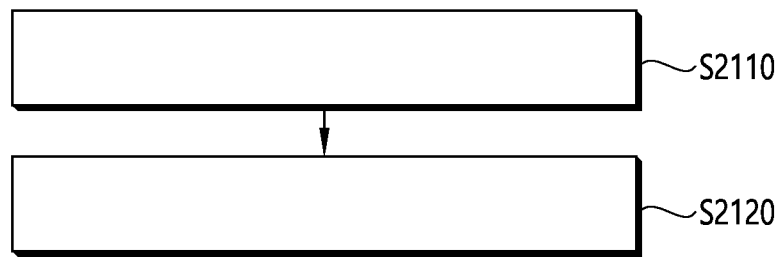
FIG. 21 is a flowchart showing an operation of a second apparatus according to an embodiment of the present disclosure.

FIG. 21 is a flowchart showing an operation of a second apparatus according to an embodiment of the present disclosure.

Operations disclosed in the flowchart of FIG. 21 may be performed in combination with various embodiments of the present disclosure. In one example, operations disclosed in the flowchart of FIG. 21 may be performed based on at least one of devices illustrated in FIGS. 22 to 27. In another example, a second apparatus of FIG. 21 may correspond to a second wireless device 200 of FIG. 23 to be described later. In one example, a second apparatus of FIG. 21 may correspond to a first wireless device 100 of FIG. 23 to be described later.

In step S2110, a second apparatus according to an embodiment may receive a physical sidelink control channel (PSCCH) from a first apparatus, based on one subchannel among M subchannels related to a sidelink slot.

In step S2120, a second apparatus according to an embodiment may receive a physical sidelink shared channel (PSSCH) related to the PSCCH from the first apparatus, based on N subchannels among the M subchannels.

In one embodiment, the M subchannels and the N subchannels may be adjacent to each other on a frequency axis.

In one embodiment, the one subchannel may be determined as one of a subchannel with the highest index or a subchannel with the lowest index among the N subchannels, based on at least one of the N, a transmission resource reservation period, PSSCH rank information, or modulation and coding scheme (MCS) information. Here, the N may be greater than or equal to 2, smaller than or equal to the M, and the M and the N may be a positive integer.

In one embodiment, the PSCCH may be transmitted based on a pre-configured number of resource blocks (RBs) and a pre-configured resource location within a subchannel through which the PSSCH is transmitted, based on the N is 1.

In one embodiment, the one subchannel may be determined as the subchannel with the lowest index among the N subchannels, based on the N is 2.

In one embodiment, the one subchannel may be determined as the subchannel with the highest index among the N subchannels, based on the N is 2.

In one embodiment, the one subchannel may be determined as the subchannel with the lowest index among the N subchannels, based on the N is 3.

In one embodiment, the one subchannel may be determined as the subchannel with the highest index among the N subchannels, based on the N is 3.

In one embodiment, the PSCCH may be transmitted based on a pre-configured number of RBs and a pre-configured resource location within a subchannel through which the PSSCH is transmitted, based on the N is 1, the one subchannel may be determined as the subchannel with the lowest index among the N subchannels, based on the N is 2, the one subchannel may be determined as the subchannel with the highest index among the N subchannels, based on the N is 3.

In one embodiment, the PSCCH may be transmitted based on a pre-configured number of RBs and a pre-configured resource location within a subchannel through which the PSSCH is transmitted, based on the N is 1, the one subchannel may be determined as the subchannel with the highest index among the N subchannels, based on the N is 2, the one subchannel may be determined as the subchannel with the lowest index among the N subchannels, based on the N is 3.

In one embodiment, the one subchannel may be determined as the subchannel with the highest index among the N subchannels, based on the N is 4.

In one embodiment, the one subchannel may be determined as the subchannel with the lowest index among the N subchannels, based on the N is 4.

In one embodiment, the one subchannel may be determined based on a PSCCH subchannel index offset related to a subchannel for transmission of the PSCCH. Here, the PSCCH subchannel index offset may be determined based on at least one of the N, the transmission resource reservation period, the PSSCH rank information, or the MCS information.

In one embodiment, the one subchannel may be determined as one of the subchannel with the highest index or the subchannel with the lowest index among the N subchannels, based on at least one of the N, the transmission resource reservation period, the PSSCH rank information, or the MCS information, included in first sidelink control information (SCI) related to the PSCCH.

According to an embodiment of the present disclosure, a second apparatus for performing wireless communication may be proposed. The second apparatus may comprise: one or more memories storing instructions; one or more transceivers; and one or more processors connected to the one or more memories and the one or more transceivers, wherein the one or more processors execute the instructions to: receive a physical sidelink control channel (PSCCH) from a first apparatus, based on one subchannel among M subchannels related to a sidelink slot; and receive a physical sidelink shared channel (PSSCH) related to the PSCCH from the first apparatus, based on N subchannels among the M subchannels, wherein the M subchannels and the N subchannels are adjacent to each other on a frequency axis, wherein the one subchannel is determined as one of a subchannel with the highest index or a subchannel with the lowest index among the N subchannels, based on at least one of the N, a transmission resource reservation period, PSSCH rank information, or modulation and coding scheme (MCS) information, and wherein the N is greater than or equal to 2, smaller than or equal to the M, and the M and the N are a positive integer.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
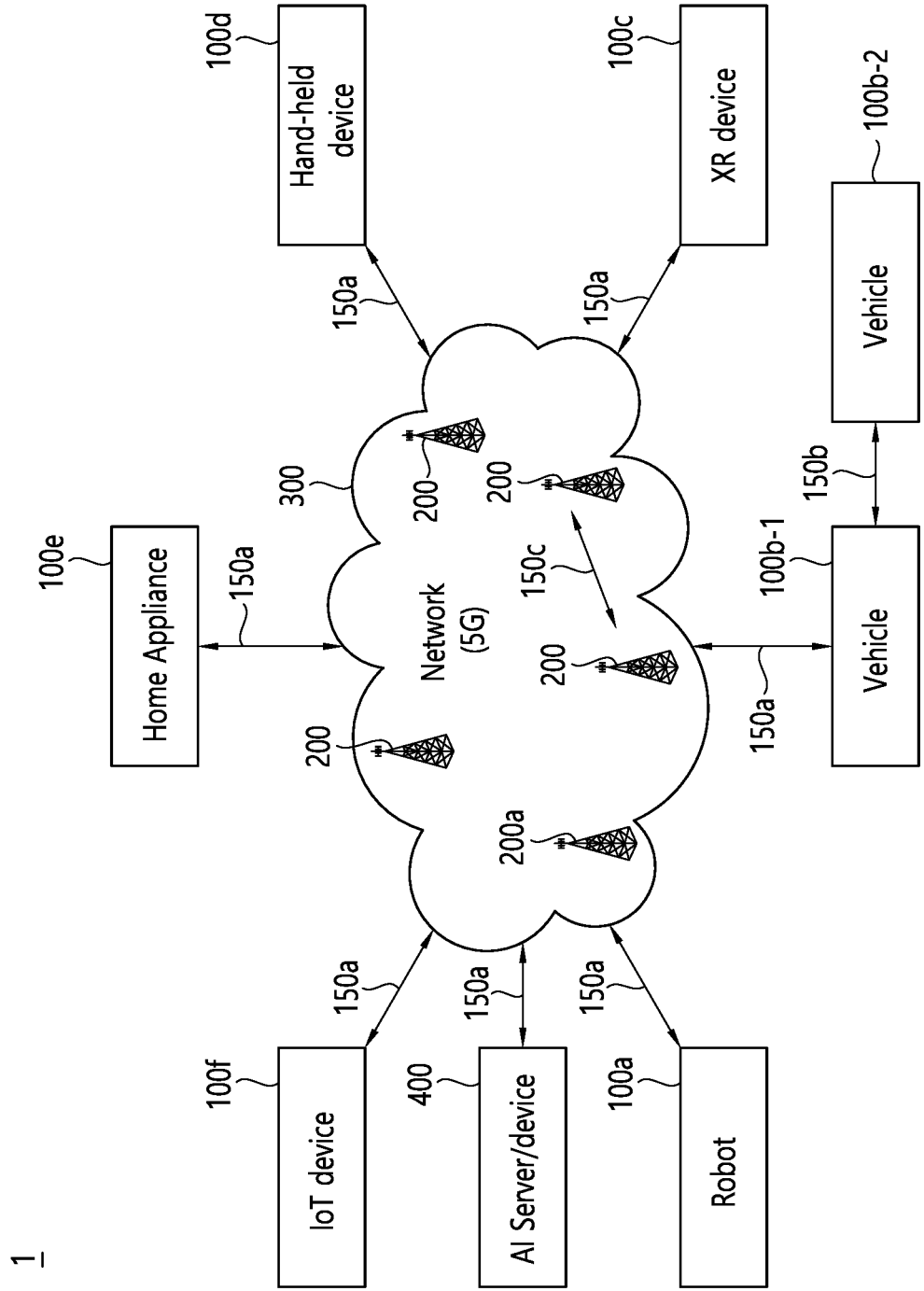
FIG. 22 shows a communication system 1, based on an embodiment of the present disclosure.

FIG. 22 shows a communication system 1, based on an embodiment of the present disclosure.

Referring to FIG. 22, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
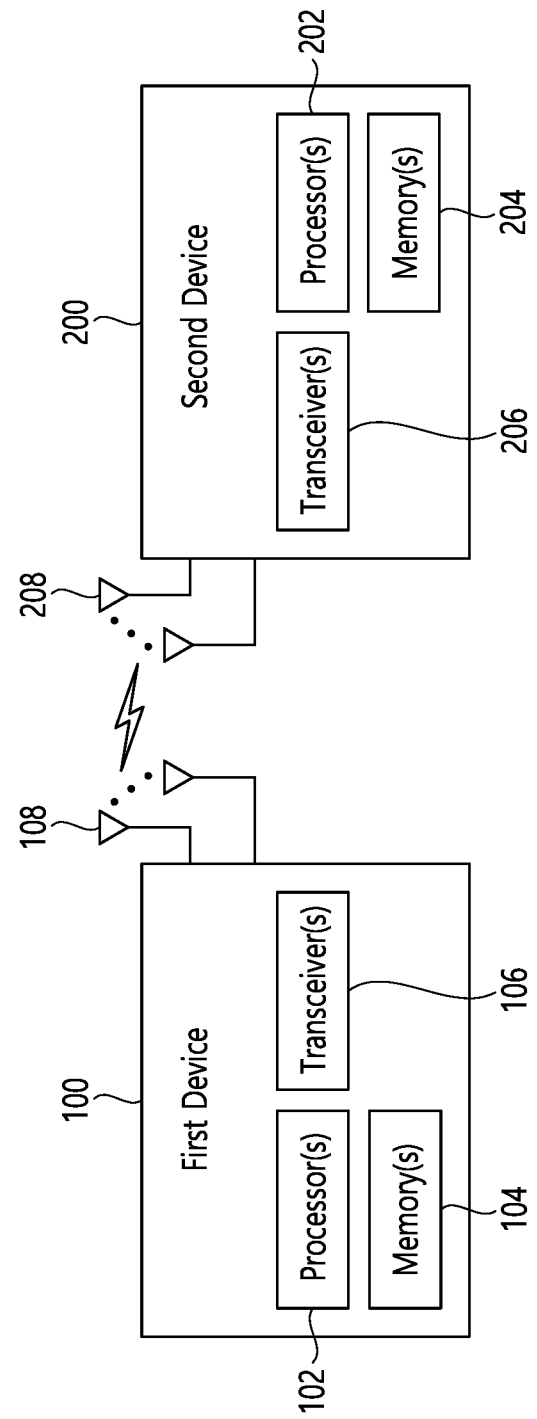
FIG. 23 shows wireless devices, based on an embodiment of the present disclosure.

FIG. 23 shows wireless devices, based on an embodiment of the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
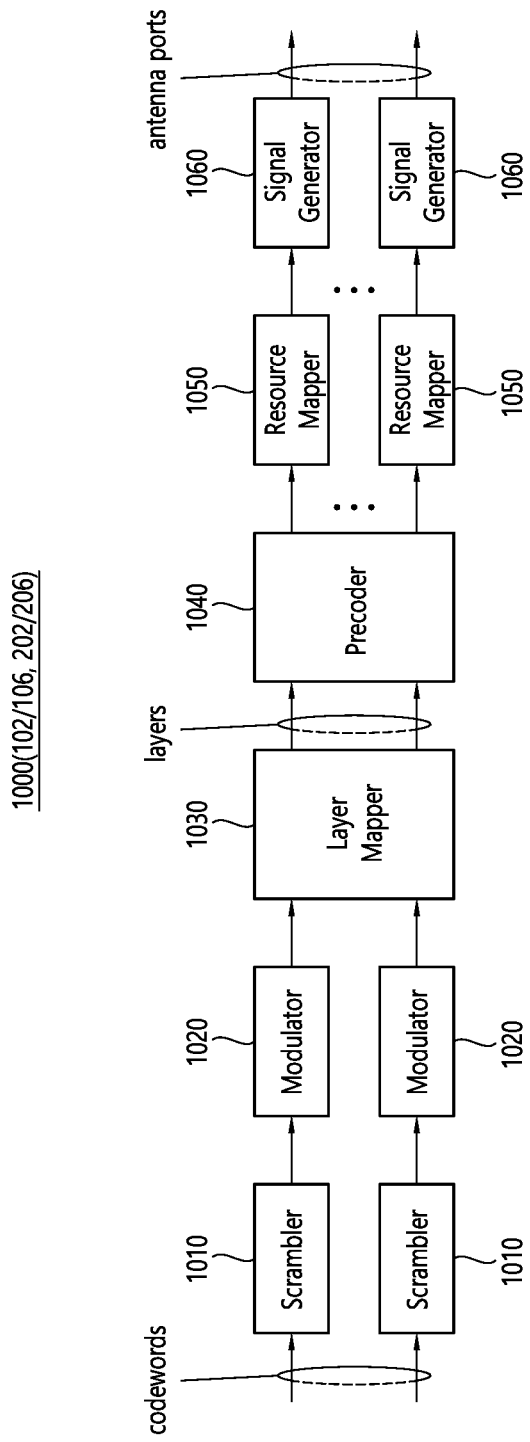
FIG. 24 shows a signal process circuit for a transmission signal, based on an embodiment of the present disclosure.

FIG. 24 shows a signal process circuit for a transmission signal, based on an embodiment of the present disclosure.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
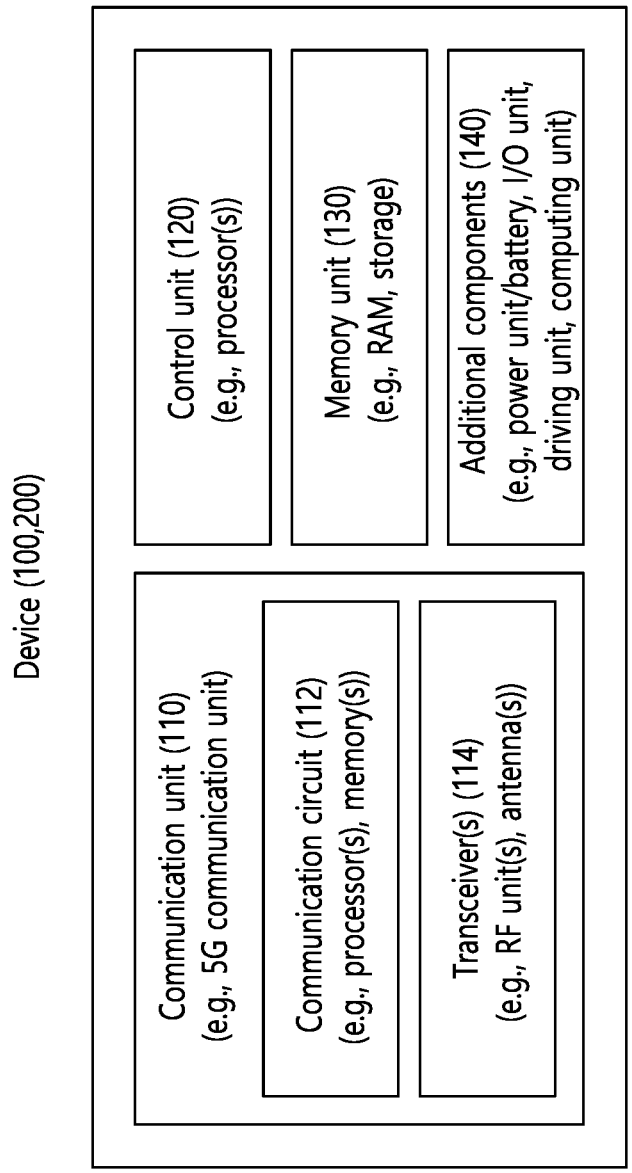
FIG. 25 shows another example of a wireless device, based on an embodiment of the present disclosure.

FIG. 25 shows another example of a wireless device, based on an embodiment of the present disclosure. The wireless device may be implemented in various forms according to a use-case/service (refer to FIG. 22).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
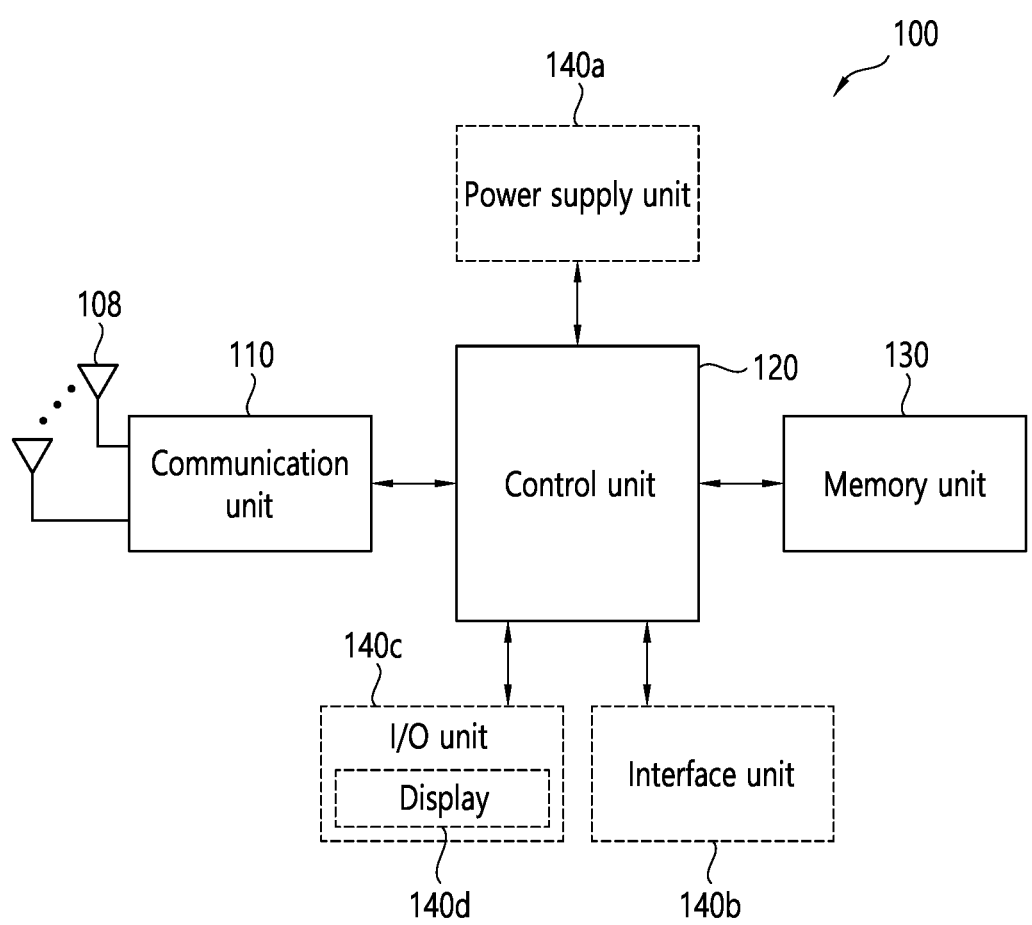
FIG. 26 shows a hand-held device, based on an embodiment of the present disclosure.

FIG. 26 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
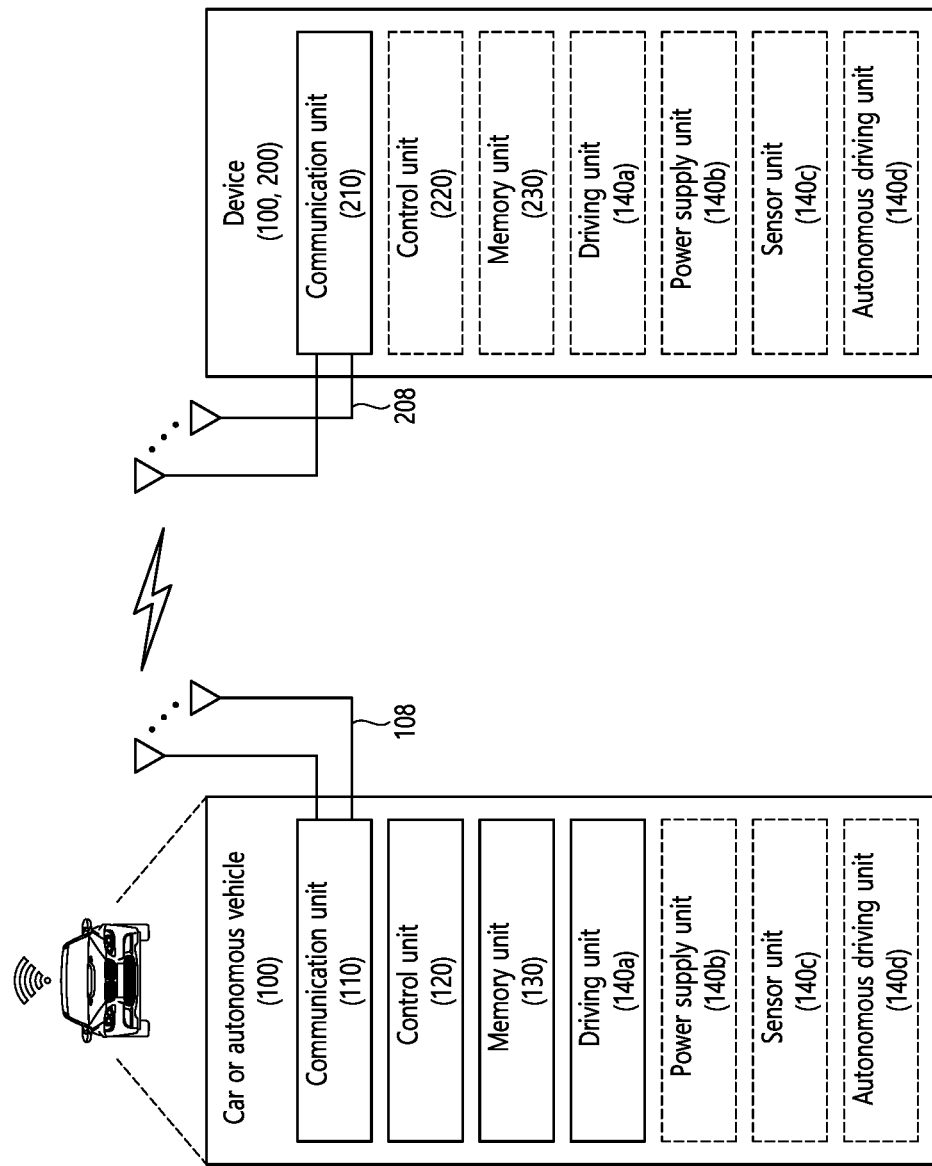
FIG. 27 shows a vehicle or an autonomous vehicle, based on an embodiment of the present disclosure.

FIG. 27 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 27, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, inter-apparatus communication, the method comprising:
    performing an inter-apparatus physical control channel transmission to a second apparatus, based on one subchannel among M subchannels related to an inter-apparatus communication slot; and
    performing an inter-apparatus physical shared channel transmission related to the inter-apparatus physical control channel transmission to the second apparatus, based on N subchannels among the M subchannels,
    wherein the M subchannels are adjacent to each other on a frequency axis,
    wherein the N subchannels are adjacent to each other on a frequency axis,
    wherein the one subchannel is determined as a subchannel with the highest index or a subchannel with the lowest index among the N subchannels, based on information for a modulation and coding scheme,
    wherein the N is greater than or equal to 2,
    wherein the N is smaller than or equal to the M, and
    wherein the M and the N are positive integers.

2. The method of claim 1, wherein the inter-apparatus physical control channel transmission is performed based on a pre-configured number of resource blocks (RBs) and a pre-configured resource location within a subchannel through which the inter-apparatus physical shared channel transmission is performed.

3. The method of claim 1, wherein the one subchannel is determined based on an inter-apparatus physical control channel subchannel index offset related to a subchannel for the inter-apparatus physical control channel transmission, and
    wherein the inter-apparatus physical control channel subchannel index offset is determined based on the modulation and coding scheme (MCS) information.

4. The method of claim 1, wherein the same beam forming is applied to a resource block related to the inter-apparatus physical control channel transmission and a resource block related to the inter-apparatus physical shared channel transmission.

5. The method of claim 1, wherein an inter-apparatus physical shared channel demodulation reference signal transmission is performed on a resource region that is frequency division multiplexed with the inter-apparatus physical control channel transmission.

6. A first apparatus for performing wireless communication, the first apparatus comprising:
    one or more memories storing instructions;
    one or more transceivers; and
    one or more processors connected to the one or more memories and the one or more transceivers, wherein the one or more processors execute the instructions to:
    perform an inter-apparatus physical control channel transmission to a second apparatus, based on one subchannel among M subchannels related to an inter-apparatus communication slot; and
    perform an inter-apparatus physical shared channel transmission related to the inter-apparatus physical control channel transmission to the second apparatus, based on N subchannels among the M subchannels,
    wherein the M subchannels are adjacent to each other on a frequency axis,
    wherein the N subchannels are adjacent to each other on a frequency axis,
    wherein the one subchannel is determined as a subchannel with the highest index or a subchannel with the lowest index among the N subchannels, based on information for a modulation and coding scheme,
    wherein the N is greater than or equal to 2,
    wherein the N is smaller than or equal to the M, and
    wherein the M and the N are positive integers.

7. An apparatus configured to control a first user equipment (UE), the apparatus comprising:
    one or more processors; and
    one or more memories operably connectable to the one or more processors and storing instructions, wherein the one or more processors execute the instructions to:

perform an inter-UE physical control channel transmission to a second UE, based on one subchannel among M subchannels related to an inter-UE communication slot; and perform an inter-UE physical shared channel transmission related to the inter-UE physical control channel transmission to the second UE, based on N subchannels among the M subchannels, wherein the M subchannels are adjacent to each other on a frequency axis, wherein the N subchannels are adjacent to each other on a frequency axis, wherein the one subchannel is determined as a subchannel with the highest index or a subchannel with the lowest index among the N subchannels, based on information for a modulation and coding scheme, wherein the N is greater than or equal to 2, wherein the N is smaller than or equal to the M, and wherein the M and the N are positive integers.

* * * * *